(12) United States Patent
Yu et al.

(10) Patent No.: US 11,421,993 B2
(45) Date of Patent: Aug. 23, 2022

(54) HUMAN VISION-EMPOWERED 3D SCENE ANALYSIS TOOLS

(71) Applicant: UNIVERSITY OF MASSACHUSETTS, Boston, MA (US)

(72) Inventors: Lap-Fai Yu, Falls Church, VA (US); Haikun Huang, Quincy, MA (US)

(73) Assignee: UNIVERSITY OF MASSACHUSETTS, Boston, MA (US)

( * ) Notice: Subject to any disclaimer, the term of this patent is extended or adjusted under 35 U.S.C. 154(b) by 206 days.

(21) Appl. No.: 16/598,718

(22) Filed: Oct. 10, 2019

(65) Prior Publication Data

US 2020/0116494 A1     Apr. 16, 2020

Related U.S. Application Data

(60) Provisional application No. 62/743,681, filed on Oct. 10, 2018.

(51) Int. Cl.
    *G01C 21/20*     (2006.01)
    *A63F 13/5375*     (2014.01)

(52) U.S. Cl.
    CPC ........ *G01C 21/206* (2013.01); *A63F 13/5375* (2014.09); *A63F 2300/305* (2013.01)

(58) Field of Classification Search
None
See application file for complete search history.

(56) References Cited

U.S. PATENT DOCUMENTS

| | | | | |
|---|---|---|---|---|
| 2011/0144903 A1* | 6/2011 | Gupta | ............... | G01C 21/3476 701/533 |
| 2014/0046585 A1* | 2/2014 | Morris, IV | ......... | G01C 21/3415 701/468 |

(Continued)

OTHER PUBLICATIONS

Nassar K. Sign Visibility for Pedestrians Assessed with Agent-Based Simulation. Transportation Research Record. 2011;2264(1):18-26. doi: 10.3141/2264-03 (Year: 2011).*

(Continued)

*Primary Examiner* — James J Lee
*Assistant Examiner* — Sophia Antonia Skipper
(74) *Attorney, Agent, or Firm* — Brake Hughes Bellermann LLP

(57) ABSTRACT

Aspects and embodiments disclosed herein include a computational approach to automatically generate a wayfinding design for a given environment. To use aspects and embodiments of the disclosed computational approach, a designer specifies all the navigation scenarios likely to be taken by the users. A wayfinding design is then generated to accommodate the needs of all the scenarios while considering a number of desirable factors relevant to the navigation experience and management convenience. Through agent-based simulations, the locations of the wayfinding signs are further refined by considering visibility and robustness with respect to the possible mistakes made by the users throughout their navigation. After generating a wayfinding design, the designer can gain further insights of the design by visualizing the accessibility of a destination from any other locations in the environment and remove any blind zones by adding more signs and re-triggering the optimization.

22 Claims, 43 Drawing Sheets

(56) References Cited

U.S. PATENT DOCUMENTS

2014/0372031 A1* 12/2014 Canner ............... G09B 29/106
                                                        701/533
2018/0052002 A1*  2/2018 Delling ............ G08G 1/096838
2019/0072395 A1*  3/2019 Namboodiri ....... G06K 9/00476
2019/0179976 A1*  6/2019 Stroila ................ G08G 1/0112
2019/0306724 A1* 10/2019 Guenot-Falque ..... H04W 16/20

OTHER PUBLICATIONS

CN-107478231-A ; Dec. 2017 ; Dou Jinsheng ; ESPACE Translation (Year: 2017).*
CN-104008666-B ; Aug. 2016 ; Huang Min ; WIPO Translate Translation (Year: 2016).*
Zhe Zhang, Limin Jia, Yong Qin, "Optimal number and location planning of evacuation signage in public space", Safety Science, vol. 91, 2017, pp. 132-147, ISSN 0925-7535 (Year: 2017).*
Nguyen et al. "Optimizing the Placement of Evacuation Signs on Road Network with Time and Casualties in case of a Tsunami" (Year: 2012).*

* cited by examiner

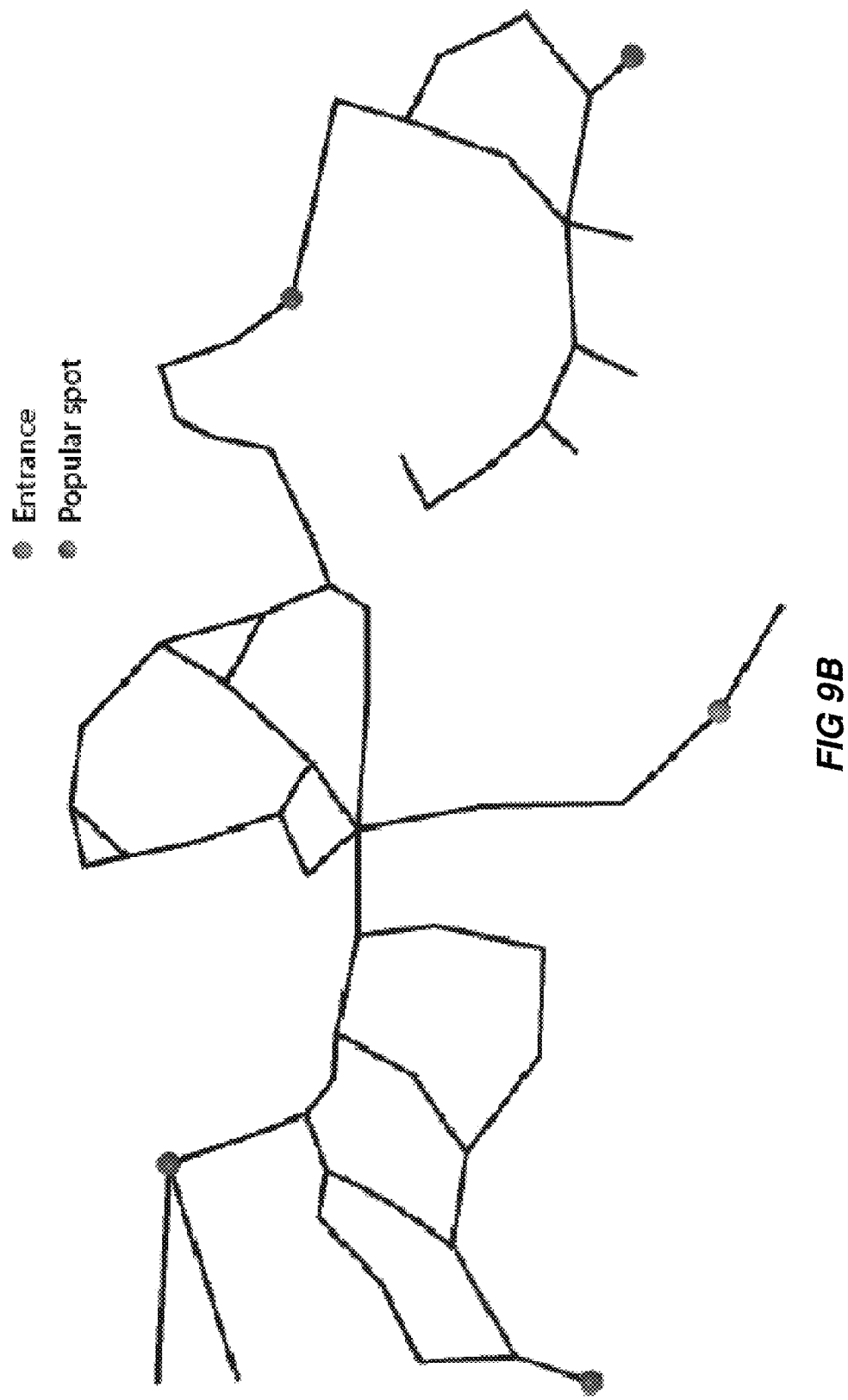

HUMAN VISION-EMPOWERED 3D SCENE ANALYSIS TOOLS

CROSS REFERENCE TO RELATED APPLICATION

This application claims the benefit of Provisional Application No. 62/743,681, filed Oct. 10, 2018, the disclosure of which is incorporated herein by reference in its entirety.

GOVERNMENT LICENSE RIGHTS

This invention was made with government support under award number 1565978 awarded by the National Science Foundation. The government has certain rights in the invention.

BACKGROUND

Wayfinding signs play an important role in guiding users to navigate in a virtual environment and in helping pedestrians to find their ways in a real-world architectural site.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 9B illustrates a layout extracted from the map of the amusement park of FIG. 9A;

DETAILED DESCRIPTION

Figure 1:
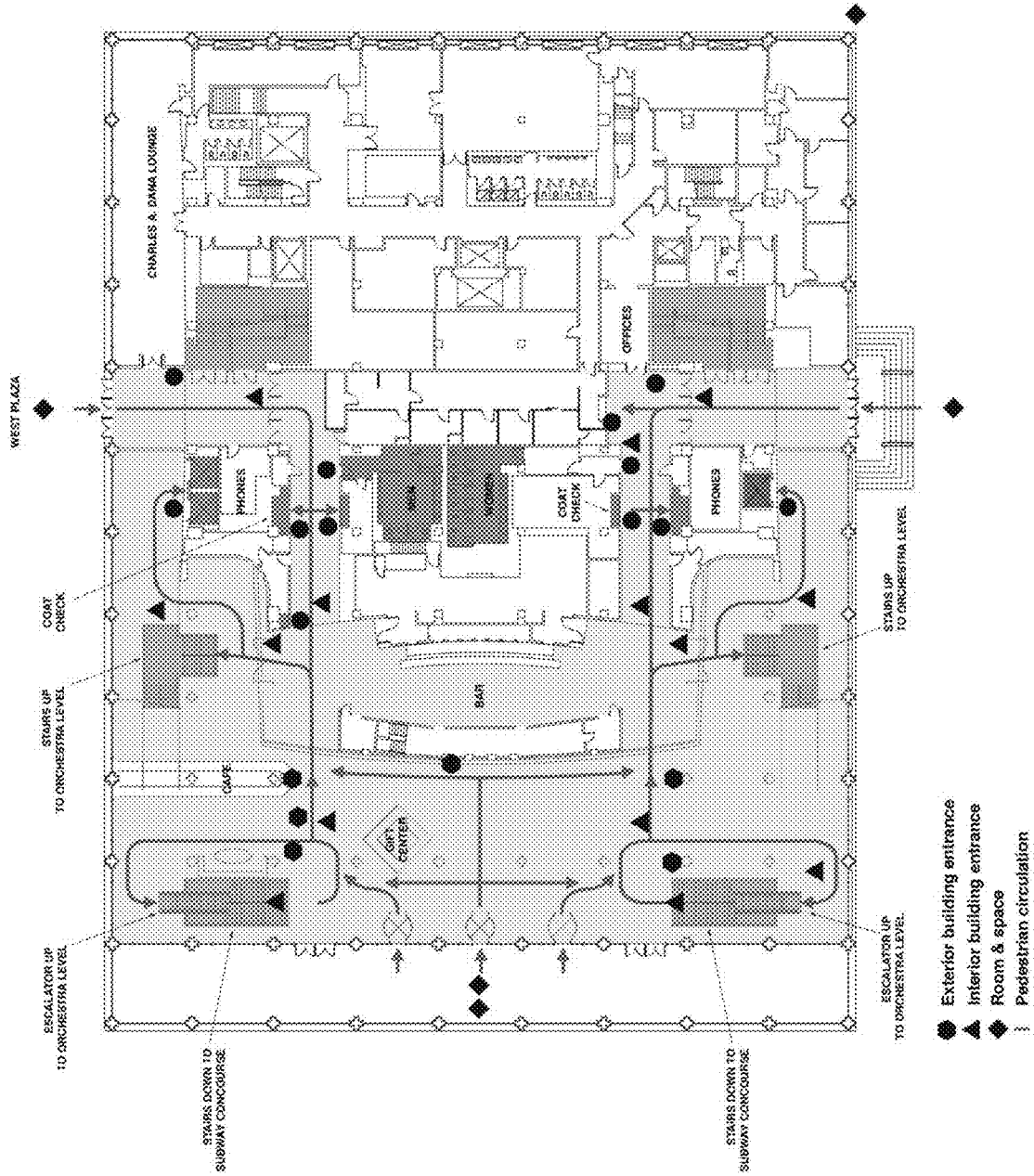
FIG. 1 illustrates circulation analysis and wayfinding scheme of a concert hall manually created by a wayfinding designers, including projected circulation paths and sign types.

Aspects and embodiments disclosed herein are generally directed to systems and methods for optimizing the design of a layout of wayfinding signs in a virtual or real-world environment. Aspects and embodiments disclosed herein include a novel optimization and agent-based approach for automatically generating wayfinding designs.

Conventionally, the wayfinding design of a virtual environment or a real-world architectural site is created manually. The many possible navigation scenarios, as well as the interplay between signs and human navigation, can make the manual design process overwhelming and non-trivial. As a result, creating a wayfinding design for a typical layout can take months to several years. Aspects and embodiments disclosed herein include automatically generating a wayfinding design for a given layout. A designer may specify some navigation scenarios and aspects and embodiments disclosed herein may automatically generate an optimized wayfinding design with signs properly placed considering human agents' visibility and possibility of making mistakes during a navigation. The resultant optimized wayfinding design can guide pedestrians to their destinations effectively and efficiently. It is to be understood that the term pedestrian is used herein to refer to a traveler that is walking, bicycle riding, driving, or otherwise travelling through an environment. The term walking as used herein is to be understood to also encompass travelling by other methods, for example, by bicycle or car.

Aspects and embodiments disclosed herein can also help the designer visualize the accessibility of a destination from different locations and correct any "blind zone" with additional signs.

Imagine walking in a subway station with no wayfinding signs. How could you walk to the right platform after you buy your ticket? After some random trials, you might finally find your way to the platform, but this probably would not be a pleasant experience. You would have saved much time and energy if wayfinding signs had been placed properly in the environment to guide you through. A layout with no wayfinding signs is as confusing as a maze.

Wayfinding aids are especially important in virtual environments because it is very easy to get disoriented throughout a navigation in a virtual space. A well-constructed environment should include environmental wayfinding aids thoughtfully put by the level designers, considering the possible navigation and the navigation goals of the user. It has been discovered that most users feel uncomfortable being in a largely void virtual environment, and that it is important to regularly reassure the users that they are not lost throughout a navigation.

Conventionally, level designers mainly rely on experience or a "common sense approach" in creating a wayfinding design. Given an environment, they think of all likely navigation scenarios that the user will go through and then place wayfinding signs or other aids to guide the user accordingly. For example, for a train station, one common scenario is to walk from the ticket machine, through the gate, and then to the right platform. Another common scenario is to walk from the platform to the exit. Directional signs may be placed by a wayfinding designer along these routes. While this design approach is straightforward, the efforts required quickly become daunting when the number of scenarios scales up as in a real-world situation. For example, a real-world train station typically involves tens or more navigation scenarios.

Moreover, when placing the signs, it is desirable to consider the users' visibility and the possibility that the user may miss a sign or make mistakes throughout the navigation. Designing a wayfinding scheme that jointly considers all these factors is highly non-trivial and challenging, while a sub-optimal wayfinding scheme may easily result in a confusing and frustrating navigation experience of the users.

To tackle these problems, aspects and embodiments disclosed herein include a computational approach to automatically generate a wayfinding design for a given environment. To use aspects and embodiments of the disclosed computational approach, a designer specifies all the navigation scenarios likely to be taken by the users. Aspects and embodiments of the approach will then generate a wayfinding design to accommodate the needs of all the scenarios while considering a number of desirable factors relevant to the navigation experience and management convenience. Through agent-based simulations, aspects and embodiments of the disclosed approach further refines the locations of the wayfinding signs by considering visibility and robustness with respect to the possible mistakes made by the users throughout their navigation. After generating a wayfinding design, the designer can gain further insights of the design by visualizing the accessibility of a destination from any other locations in the environment and remove any blind zones (if desired) by adding more signs and re-triggering the optimization.

In a real-world architectural site, typical wayfinding aids include signs, landmarks and GPS-based mobile navigation system. In a virtual environment, additional virtual wayfinding aids such as compasses and mini-maps can also be used to facilitate wayfinding. Aspects and embodiments disclosed herein focus on generating signs to guide the user because: 1) signs are a very common and universal mean for wayfinding; 2) signs as wayfinding aids are direct yet subtle—the user usually does not need to stop walking while reassuring his direction with a sign he sees on his way, in contrast to using other wayfinding aids such as a map which the user may stop his locomotion to consult; 3) signs integrate naturally with most indoor and outdoor environments.

Aspects and embodiments of the disclosed approach may be implemented as a plugin for a video game engine, for example, the Unity game engine developed by Unity Technologies, which can be used by game level designers to automatically and quickly generate wayfinding schemes for their virtual worlds, hence saving their time and manual efforts spent on determining users' paths and placing wayfinding signs.

Aspects and embodiments of the approach disclosed herein can be applied to automatically generate wayfinding designs for a variety of layouts. The designs can be used by human users to navigate to their destinations effectively in both the real world and in virtual worlds. Compared to the conventional approach of creating wayfinding designs manually, aspects and embodiments of the disclosed approach include formulating the problem as an optimization, which can be solved automatically and efficiently, hence overcoming the design challenge posed by the considerations of multiple paths and design criteria. The optimization approach also allows the flexibility of considering additional constraints in wayfinding design and the designer can tradeoff between different criteria by controlling their corresponding weights. Aspects and embodiments disclosed herein adopt an agent-based approach to automatically place signs at strategic locations, considering human perception and navigation properties such as eyesight and the possibilities of making mistakes. The agent model makes it intuitive and flexible for designers to define agent properties and behaviors according to the specific requirements of their design projects on hand; optimized sign locations may be automatically determined and signs may be automatically placed according to the specified agent properties.

Conventional Wayfinding Design:

In architectural design, wayfinding refers to the user experience of orientation and choosing paths within a built environment, which usually relates to the user's desires or the attractiveness of the places and streets in the environment. Wayfinding may include the use of signage and other graphical and visual clues that aid orientation and navigation in built environments.

The process of wayfinding—how humans walk or otherwise travel to their destinations in an unfamiliar environment—involves four major steps: orientation, path decision, path monitoring, and destination recognition. Orientation refers to determining one's current location. Path decision refers to selecting paths to navigate to the destination. Path monitoring refers to continuously verifying that the path indeed leads to the destination. Destination recognition refers to confirming that the destination has been reached. Aspects and embodiments disclosed herein automatically generate a wayfinding design for a given environment to facilitate the above wayfinding steps.

Today almost all public spaces and private premises would benefit from a wayfinding scheme to ensure that they are universally accessible for all users. To achieve this goal, after a layout is designed by architects, a wayfinding design team decides about the wayfinding signs to put in the environment. In current practice, the design team manually creates a wayfinding scheme following a "Common Sense Approach" mainly based on experience. Given a new premises such as a train station, designers may create a wayfinding scheme following the following major steps:

1) Identifying Major Paths: The design team first identifies the major paths likely to be taken by pedestrians, by experience or surveys with the property managers. The team examines the site's floor plan or make an on-site inspection to estimate people flows. The goal is to gain a comprehensive understanding of the site.

2) Devising a Wayfinding Scheme: Considering all the major paths, the design team determines the types and locations of the wayfinding signs, which should be placed at an appropriate height and angle clearly visible to pedestrians. Additional signs should be placed to eliminate any possible confusion caused by the architecture itself. As an example, FIG. 1 shows the circulation analysis and a wayfinding scheme manually created for a concert hall.

3) Designing, Fabricating and Placing Signs: After devising the sign placement, the designers design the appearance of the signs to be manufactured and placed in the real environment.

4) Evaluation, Maintenance and Update: The team maintains the wayfinding signs in a database and reviews the sign placement periodically to replace any outdated signs.

Similar to the real-world wayfinding design process, aspects and embodiments of the computational approach disclosed herein focuses on automatically identifying locations for placing signs in an environment according to the designer specified navigation goals of the pedestrians.

Figure 2A:
FIG. 2A illustrates an example of road signs used in a video game.
Figure 2B:
FIG. 2B illustrates another example of road signs used in a video game.

Wayfinding Design for Virtual Environments:

Wayfinding aids are useful in virtual environments because they help users form cognitive maps, maintain a sense of position and direction of travel, and find their ways to their destinations. Common wayfinding aids in virtual environments include signs, maps, landmarks, light, and paths. In designing a highly immersive and steerable virtual environment, it is important for level designers to make use of wayfinding aids effectively to enhance spatial understanding of the environment so that users can comprehend and operate smoothly. This principle also applies to game level design. FIG. 2A and FIG. 2B shows some example road signs as used in different video games.

In current practice, wayfinding aids are manually added to a virtual environment by level designers and then empirically tested for effectiveness, which depends on the quantity and quality of wayfinding aids provided to users, yet research has found that it could be overwhelming to users if exposed to too many wayfinding aids.

Experiments have verified that human wayfinding strategies and behaviors in large virtual worlds are strongly influenced by environmental cues. Humans generally adopt physical world wayfinding strategies in large virtual worlds, hence common wayfinding aids in the physical world can be effectively applied to facilitate wayfinding in virtual worlds. Subjects who navigate a virtual environment with the aid of signs achieve superior performance than under other conditions.

Aspects and embodiments disclosed herein include optimizing the placement of wayfinding signs in a layout so as to guide pedestrians to reach their destinations easily. Combining automatically generated maps with the wayfinding signs generated by aspects and embodiments disclosed herein can potentially provide users with effective wayfinding aids to navigate smoothly in virtual environments.

Perception, Path Planning and Navigation:

In everyday environments, humans continually shift their gaze to retrieve wayfinding cues for making navigation decisions. Human visual attention is known to be attracted by low-level features such as changes in color, intensity, orientation and contrast, and by high-level scene context.

Some particular categories of objects, such as signs and texts, are known to strongly attract eye fixations regardless of their low-level visual saliency. Therefore, aspects and embodiments disclosed herein include optimizing the placement of wayfinding signs.

Given a layout, there are usually multiple paths a pedestrian can take to navigate from a starting point to a destination. For instance, suppose a hiker wants to walk from the bottom to the top of a hill. He may walk a path which is mostly straight, or a shortcut with sharp turns. A strategy for path planning is to design a cost function to evaluate each path, and then search for a path that corresponds to a low cost. For a low-dimensional configuration space, a grid-based search such as A* or D* can be applied to find an optimal path. For a high-dimensional configuration space, sampling-based approaches may be applied to find an optimal or near-optimal solution.

For path planning, navigation factors to consider in a cost function associated with a wayfinding design may include: path length (one wants to choose a short path to reduce the travel time needed to reach the destination); number of turns (one wants to minimize the number of turns to reduce the complexity of the route); and number of decision points (each intersection is a decision point where the pedestrian will need to decide which road to follow next; one wants to minimize the number of decision points to reduce the chance of making mistakes). The number of decision points has an important influence on the difficulty of performing wayfinding. Aspects and embodiments disclosed herein consider these criteria in the generation of wayfinding designs, after which the wayfinding signs are placed, and the placement is refined based on the properties of simulated agents travelling through a simulated environment including a wayfinding design. Moreover, designer can control the importance of each criterion in a cost function utilized in an optimization of a wayfinding design by adjusting its associated weight. Aspects and embodiments disclosed herein will generate a wayfinding design accordingly.

Humans occasionally make mistakes in navigation. For example, it is common for pedestrians to miss a sign due to occlusion by other pedestrians, distractions such as advertisements or events happening in the environment, or a wrongly recognized sign or landmark. It is also common for pedestrians to make wrong turns in navigation. A well-thought-through wayfinding design should tolerate these kinds of human mistakes—a pedestrian should still be able to reach to his destination even if he makes mistakes occasionally.

Aspects and embodiments disclosed herein include agent-based simulations that consider navigation mistakes to create a robust wayfinding design. Aspects and embodiments disclosed herein include applying agent-based simulations for optimizing wayfinding designs.

To achieve a robust wayfinding design, aspects and embodiments disclosed herein conduct agent-based simulations in placing the signs to evaluate how well the design can tolerate occasional mistakes made by agents. Using this approach, the designer can control how robust the generated wayfinding design should be by changing the agent parameters. For example, in creating the wayfinding design for a subway station where the pedestrians (many of whom are first-time visitors) are generally expected to be unfamiliar with the environment, the designer can adjust the agents to have a higher chance of making mistakes. Aspects and embodiments disclosed herein will generate a more robust wayfinding design by placing signs in important locations so that pedestrians can still find their ways despite the mistakes.

Computational Layout Design:

Layout design is an important problem in computer graphics. A layout typically consists of a number of sites connected by paths, with each site serving a different purpose. Computer-generated layouts can be used for creating virtual environments where virtual agents and human users can navigate for simulation and entertainment purposes. Computationally generated layouts can also be used for architectural design and urban planning.

An important consideration in designing a layout is the navigation experience of the pedestrians. To be navigation-aware, generated layouts should include wayfinding signs properly placed in the layouts. The wayfinding signs automatically generated by aspects and embodiments disclosed herein can enhance the navigation experience of users in virtual environments.

Figure 3A:
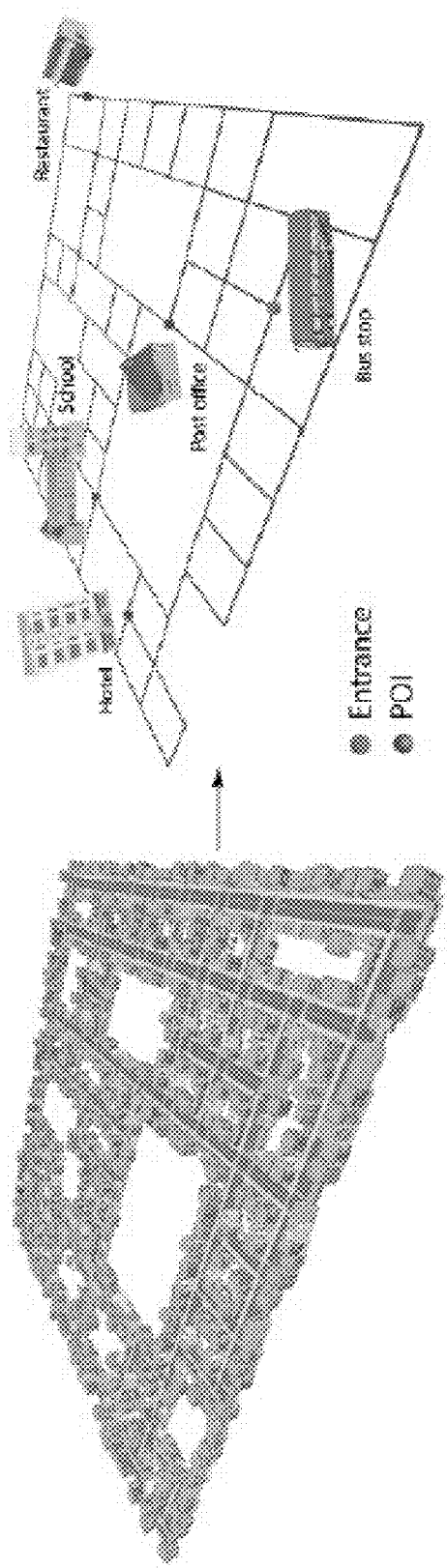
FIG. 3A illustrates act of a method disclosed herein in which an input layout is converted into a graph representation.
Figure 3B:
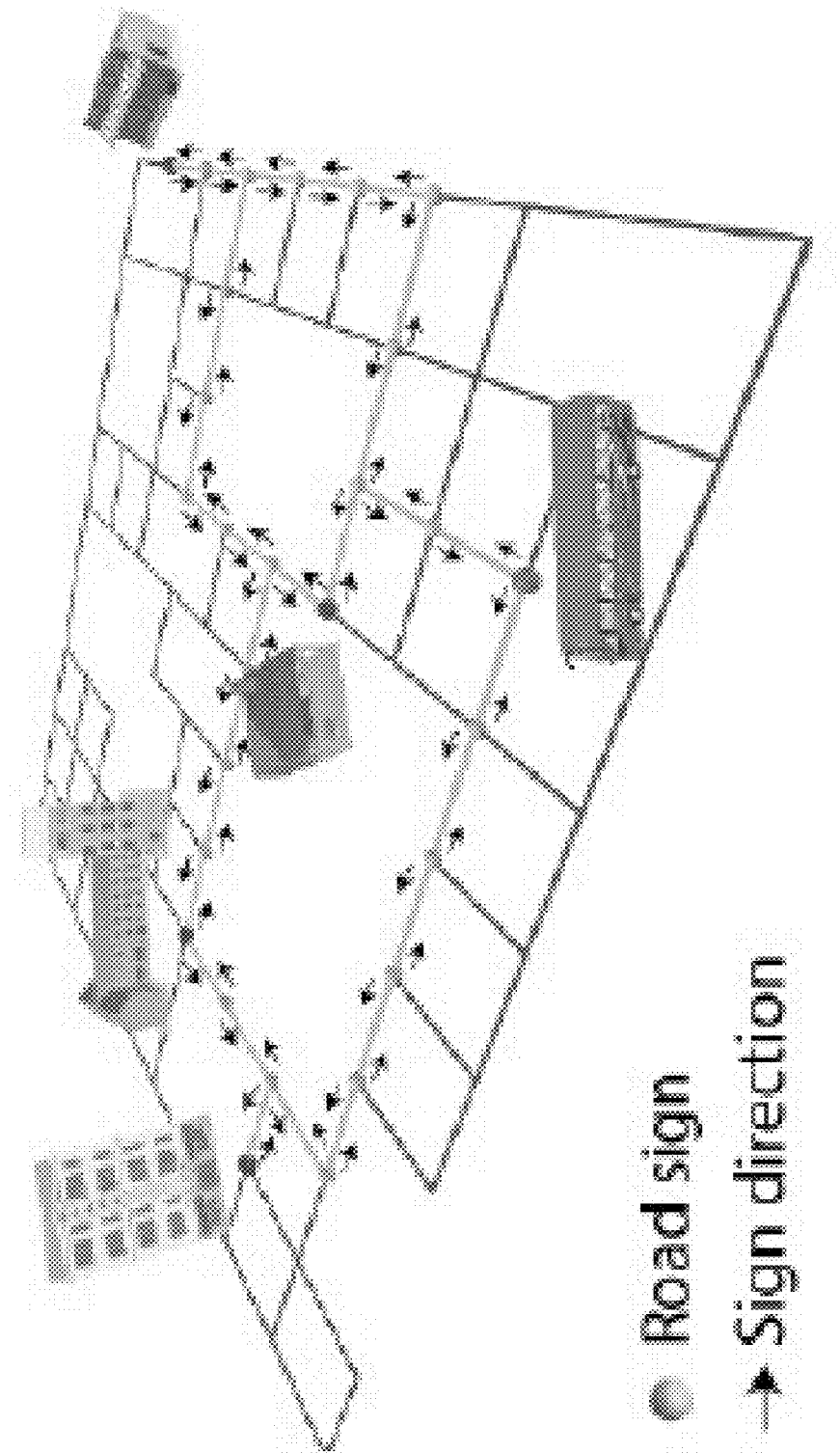
FIG. 3B illustrates act of a method disclosed herein in which a wayfinding scheme optimization is performed to find the optimized paths from the entrance to the points of interests in an environment considering wayfinding criteria such as path lengths, turn angles, and number of decision points.
Figure 3C:
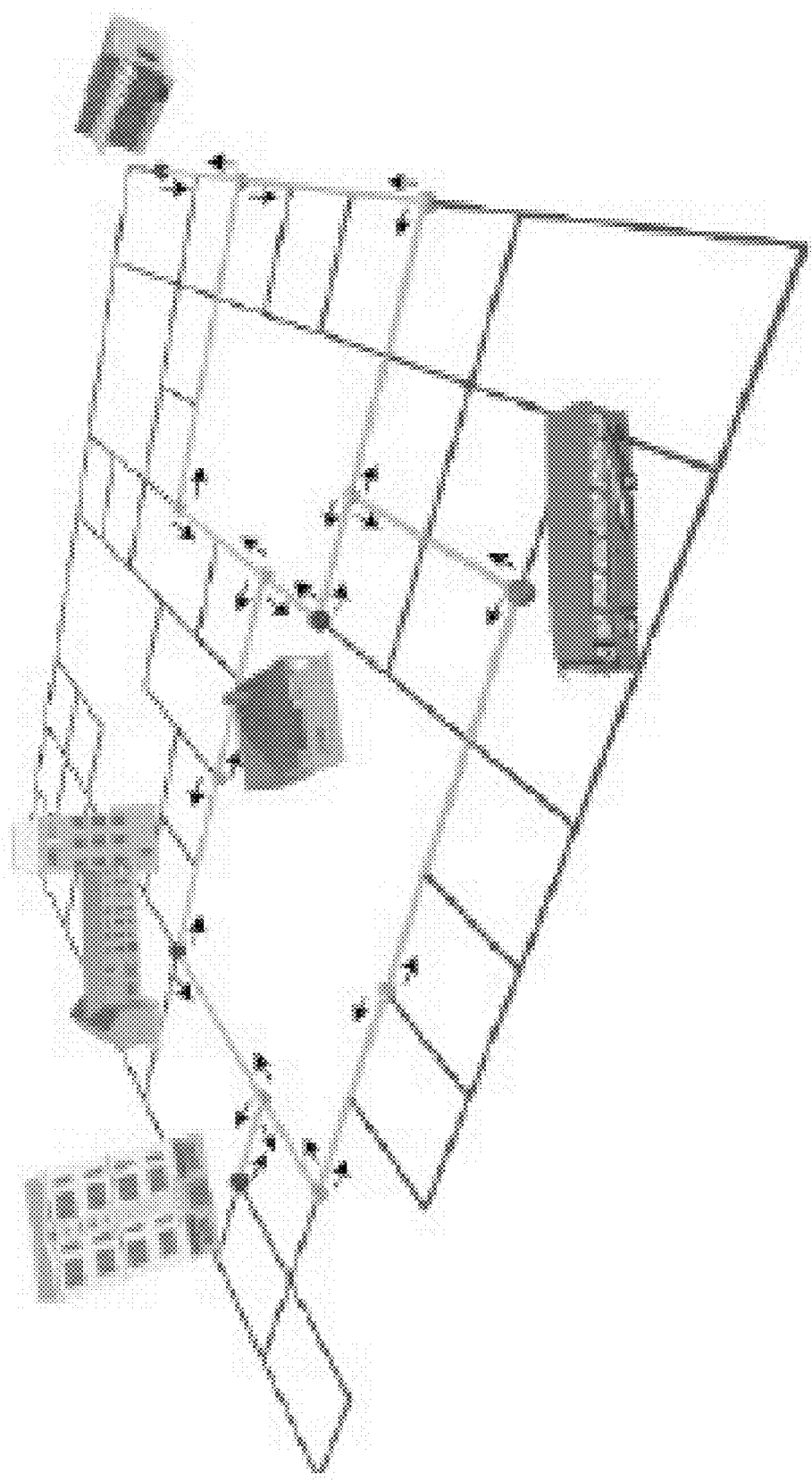
FIG. 3C illustrates act of a method disclosed herein in which an agent-based sign refinement takes place, which employs agent-based simulations to evaluate and refine the sign placement according to the navigation properties of agents mimicking human pedestrians.

An overview of an aspect of automatically determining optimal locations for wayfinding signs in a layout is illustrated in FIGS. 3A-3C. A layout referred to herein as City is utilized as an illustrative example to describe the approach. The approach works on a graph representing an input layout. It includes two major steps: Wayfinding Scheme Optimization and Agent-based Sign Refinement. In the Wayfinding Scheme Optimization step, the approach determines the paths for pedestrians to walk or otherwise travel from the starting points to the destinations under different navigation scenarios specified by a user. Different human-centered navigation criteria such as turning angles and walking distances are jointly considered through an optimization to determine the paths to take. In the Agent-based Sign Refinement step, the approach places wayfinding signs strategically at appropriate locations along the paths. By using agent-based simulations to evaluate sign placement, the approach takes into account different human properties such as visibility and the possibility of making navigation mistakes. Depending on the goals of the navigation scenarios, the designer can easily generate a wayfinding design that satisfies the domain-specific requirements, by changing the weights of different criteria in the wayfinding scheme optimization and the parameters of the agent-based simulations.

Representation:

In various aspects and embodiments disclosed herein, the user first creates a graph $G=\{V, E\}$ to represent the input layout, where V is the set of nodes representing the intersections, entrances and points-of-interest (POIs), and E is the set of edges representing the connecting paths between adjacent nodes. The creation process is, in some embodiments, similar to specifying a waypoint system in typical game level design. The user places nodes at the intersections, entrances, and POIs of the layout. For example, in the illustrative example, City, the POIs include the school, the post office and so forth. The user also adds an edge between two adjacent nodes if the places represented by the nodes are connected by a road or other pathway.

A source-destination pair encodes a navigation scenario to be considered by the approach, e.g., going from a bus stop to a restaurant, akin to an input pair a wayfinding designer may create to specify a navigation scenario in a wayfinding design. Each source-destination pair $z_i=(s_i, d_i)$ consists of a source (starting point) $s_i$ and a destination $d_i$.

To facilitate the creation of source-destination pairs, by default, the approach automatically generates a source-destination pair between every node representing an entrance and every node representing a POI, with the former being the source and the latter being the destination. Additionally, the user can specify any extra pair if desired. For instance, in the City example, a user may want to create a pair connecting the hotel and the restaurant.

The user may assign an importance value $\kappa_i \in [0, 1]$ to each source-destination pair. For instance, in the City example, the (Hotel, Restaurant) pair can be given a higher importance value if many pedestrians are expected to walk from the Hotel to the Restaurant, whereas the (School, Restaurant) pair can be given a lower importance value if fewer pedestrians are expected to walk from the School to the Restaurant. In the optimization, the path connecting the Hotel with the Restaurant should be given a higher priority, compared to the path connecting the School to the Restaurant. If a tradeoff exists, it is important to make sure that pedestrians can walk conveniently from the Hotel to the Restaurant, while it may not matter as much for pedestrians to walk a somewhat inconvenient path from the School to the Restaurant.

Wayfinding Scheme Optimization:

Given a source-destination pair $z_i = (s_i, d_i)$, there could exist multiple possible paths from $s_i$ to $d_i$. Let $P_{zi}$ denote the set of all such paths. A goal is to generate a wayfinding scheme that takes all source-destination pairs $\{z_i\}$ into account and selects a path for each pair. A path $p_i \in P_{zi}$ is selected for each source-destination pair $z_i$, such that the set of all selected paths $P = \{p_i\}$ satisfies some local and global criteria defined by cost terms included in a total cost function. The problem may be formulated as an optimization of a total cost function:

$$C_{all}^P(P) = \omega_{local}^L C_{local}^L + \omega_{local}^N C_{local}^N + \omega_{local}^A C_{local}^A + \omega_{global}^L C_{global}^L + \omega_{global}^N C_{global}^N.$$

The total cost function $C_{all}^P(P)$ refers to a weighted sum of cost terms encoding the length, number of decision points and the amount of turns of each path, as well as the length and number of decision points of the overall wayfinding scheme. The user can adjust the importance of different design criteria by changing the weights co of the corresponding cost terms C, to accommodate the domain-specific needs of the layout for which the wayfinding scheme is designed. Each cost term is described in detail as follows.

Local Path Length:

In general, pedestrians prefer to walk a short distance. Hence, for each source-destination pair, a shorter path is preferred. A cost function is defined to penalize the length of the selected path of each source-destination pair:

$$C_{local}^L(P) = \frac{1}{|P|L_E} \sum_{p \in P} k_p L(p),$$

where $|P|L_E$ is the normalization factor with $|P|$ being the number of source-destination pairs and $L_E$ being the total length of all edges in graph G. $L(p)$ returns the length of path p. $\kappa_p \in [0, 1]$ is the importance value assigned to the source-destination pair that path p belongs to.

Local Path Node:

The nodes in the formulation correspond to decision points. Decision points are locations where pedestrians need to make a decision about which direction to go, such as an intersection between paths (e.g., a lobby in a subway station), or where pedestrians need to confirm the identity of the current location, such as a place of interest (e.g., a platform in a subway station). Directional or identification signs should to be placed at decision points to guide pedestrians to find their directions or identify their current locations. Paths with lots of decision points should be avoided as making each navigation decision induces stresses to the pedestrians for the fear of making a wrong decision that may lead to a wrong place. Therefore, a cost term that penalize the number of decision points of each path may be defined as:

$$C_{local}^N(P) = \frac{1}{|P||V|} \sum_{p \in P} k_p N(p),$$

where $|P| |V|$ is the normalization factor with $|P|$ being the number of source-destination pairs and $|V|$ being the total number of nodes in graph G. $N(p)$ returns the total number of nodes along path p.

Local Path Angle:

Research in spatial orientation suggests that paths with varying orientation tend to confuse pedestrians in wayfinding, causing disorientation, anxiety, and discomfort. A wayfinding scheme composed of straight paths is more intuitive for navigation. A cost term to penalize the selection of paths with varying orientation may thus be defined as follows:

$$C_{local}^A(P) = \frac{1}{|P||V|\pi} \sum_{p \in P} k_p A(p),$$

where $|P|$ 51 $V|\pi$ is the normalization factor with $|P|$ being the number of source-destination pairs and $|V|$ being the total number of nodes in graph G. The maximum absolute turning angle between two adjacent edges is $\pi$. $A(p)$ returns the sum of absolute turning angles between all adjacent edges along path p.

Global Path Length:

Aspects embodiments of the optimization schemes disclosed herein may encourage paths to overlap with each other to minimize the total length of roads (edges) that are part of a path. This property could be useful to the manager of an environment because by directing the flow of human movement to fewer roads, fewer roads will need to be maintained, patrolled and lightened up. A cost to encourage overlapping paths may be defined as follows:

$$C_{global}^L(P) = \frac{L(P)}{L_E},$$

where $L_E$ is the total length of all edges in graph G as the normalization factor. $L(P)$ returns the total length of the edges that belong to any path in P.

Global Path Node:

Aspects embodiments of the optimization schemes disclosed herein may also encourage different paths to share nodes. Similar designs can be observed in the wayfinding schemes of different real-world premises, such as subway stations, shopping malls and concert halls, where people are directed to a lobby or an information desk that can lead to multiple destinations (see FIG. 1 for an example). It could be easier for a manager of an environment to maintain signs centralized at certain locations in the environment. Also, centralizing signs could save space, which could be reserved for other better uses. A cost to encourage node sharing may be defined as follows:

$$C^N_{global}(P) = \frac{N(P)}{|V|},$$

where |V| is the total number of nodes in graph G as the normalization factor. N(P) returns the total number of nodes that belong to any path in P.

Optimization:

For each source-destination pair $z_i$, there exist a lot of possible paths going from the source to the destination. For instance, pair (Bus Stop, School) in the illustrative example (FIG. 3A-FIG. 3C) has more than 1,000 possible paths. Given the many combinations of possible paths of all pairs, the solution space could be huge as it grows exponentially with the number of pairs being considered.

To reduce the search space for a solution, a sampling-based, stochastic search algorithm may be utilized to solve the optimization problem as follows. For each pair, only the first loopless k shortest paths are considered, which can be found by Yen's algorithm in O(|E|+|V| log(|V|)) time using a Fibonacci heap, where |E| is the number of edges and |V| is the number of nodes. Deviation algorithms and alternative implementations exist that could further enhance computational efficiency. As the term is used herein a kth shortest path is at least as long as an nth shortest path, n<k.

Given the k shortest paths for each source-destination pair, combination of paths of all source-destination pairs which corresponds to a low-cost value may be found. Even though the size of the solution space may be reduced this way, an exhaustive search for the global optimum would still require heavy computation exponential to the number of pairs being considered.

Aspects and embodiments disclosed herein may find a local optimum as an approximate optimized solution. The simulated annealing technique with a Metropolis Hasting state-searching step may be utilized to explore the complex optimization landscape. The optimization proceeds iteratively. In each iteration, the current solution P is altered by a proposed move to another solution P', which may or may not be accepted depending on the acceptance probability of the proposed solution. More specifically, the acceptance probability is calculated by the Metropolis criterion:

$$Pr(P' \mid P) = \min\left(1, e^{\frac{1}{T}(C^P_{all}(P) - C^P_{all}(P) - C^P_{all}(P'))}\right),$$

where T is the temperature of the annealing process. T is high at the beginning of the optimization, allowing the optimizer to explore the solution space more aggressively; T is low towards the end of the optimization, allowing the optimizer to refine the solution. Essentially, the optimizer accepts any solution with a lower cost, while it accepts a solution with a higher cost at a probability: the higher the cost, the lower the acceptance probability. The optimization terminates if the absolute change in cost is less than a predefined amount over a predetermine number of iterations, for example, 1% over 1,000 iterations.

Figure 4A:
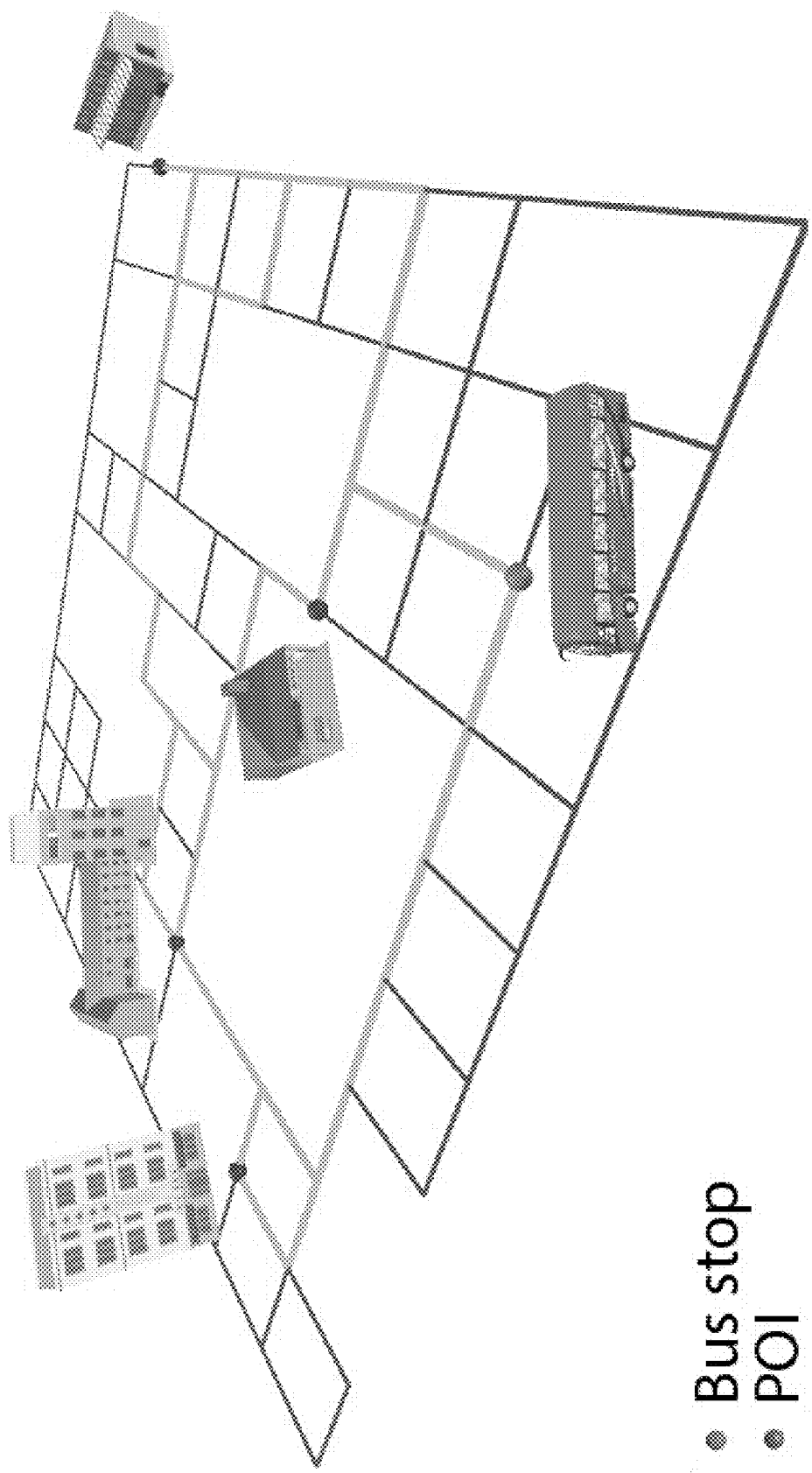
FIG. 4A illustrates a wayfinding scheme generated at initialization of an optimization of a city environment.
Figure 4B:
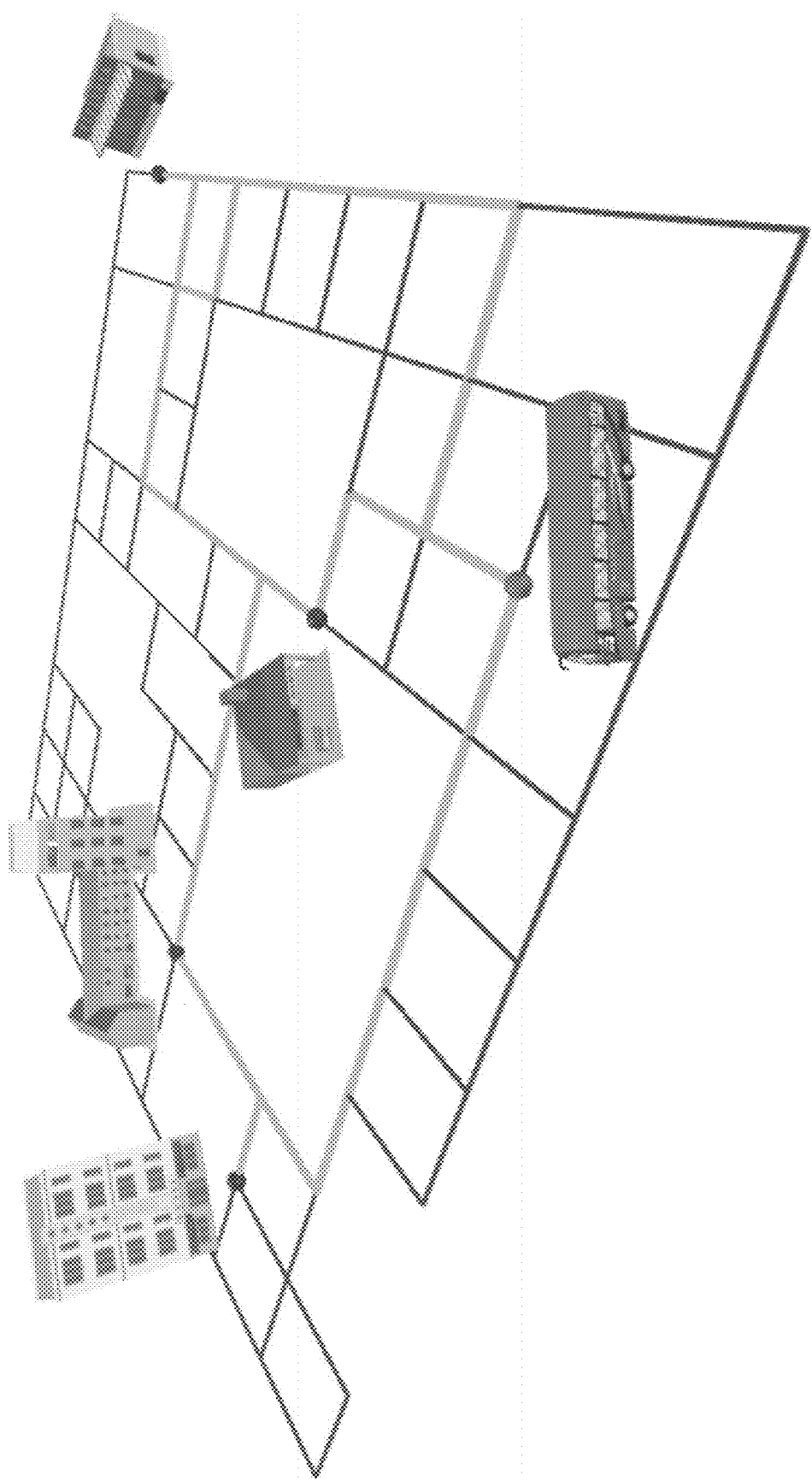
FIG. 4B illustrates a wayfinding scheme generated after 5000 iterations of the optimization of the city environment.
Figure 4C:
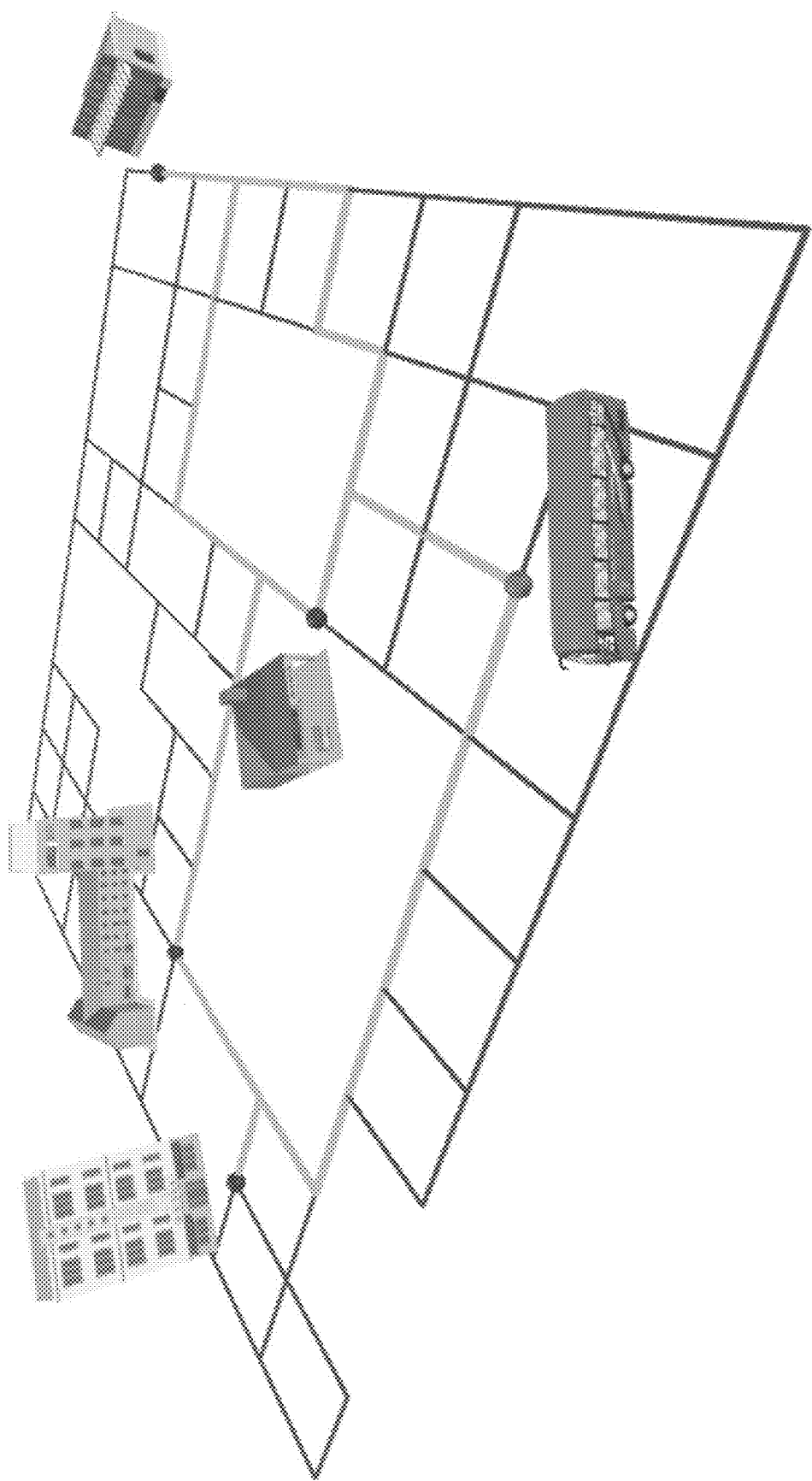
FIG. 4C illustrates a wayfinding scheme generated after 30,000 iterations of the optimization of the city environment.
Figure 4D:
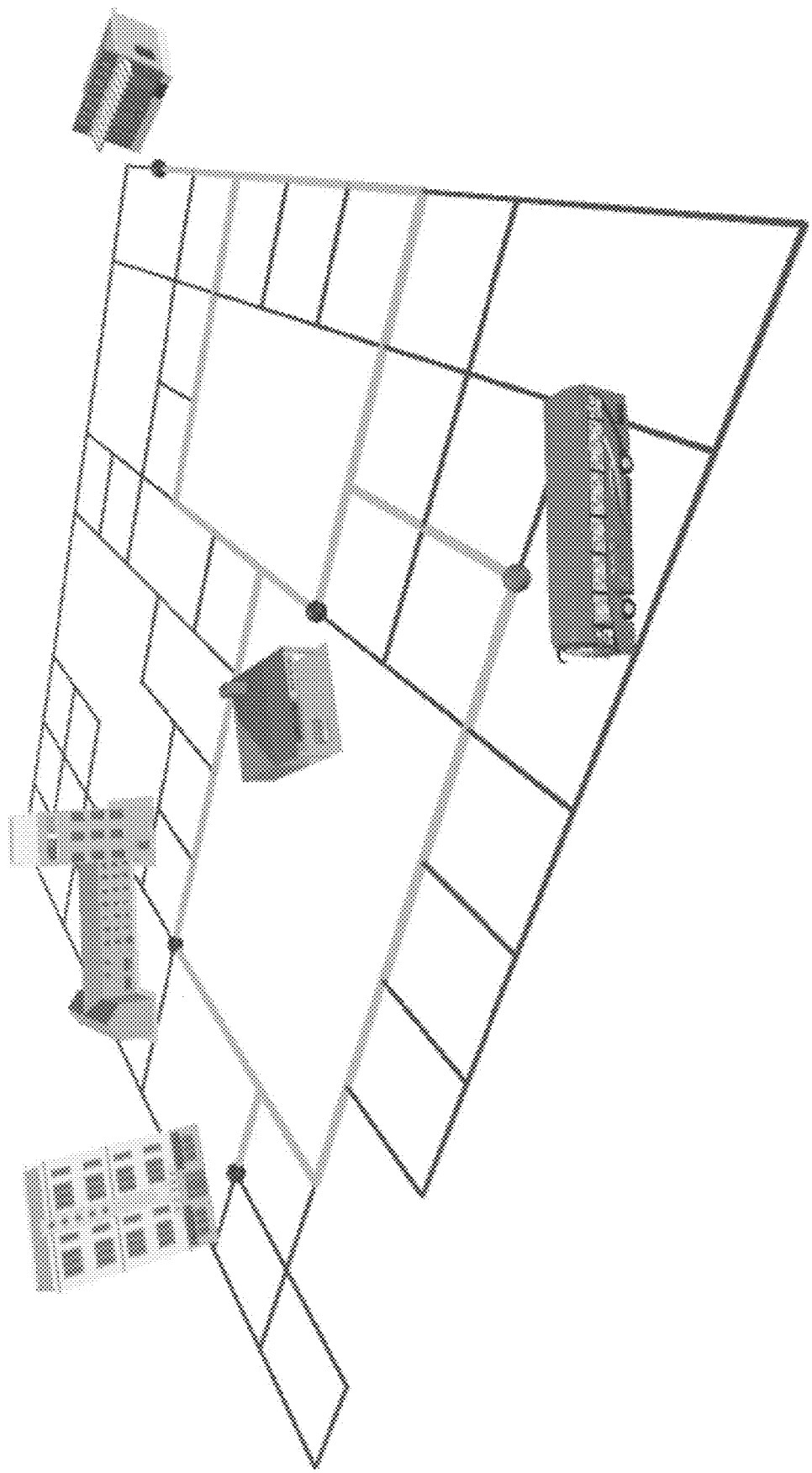
FIG. 4D illustrates an optimized result of a wayfinding scheme generated in the optimization of the city environment.
Figure 5:
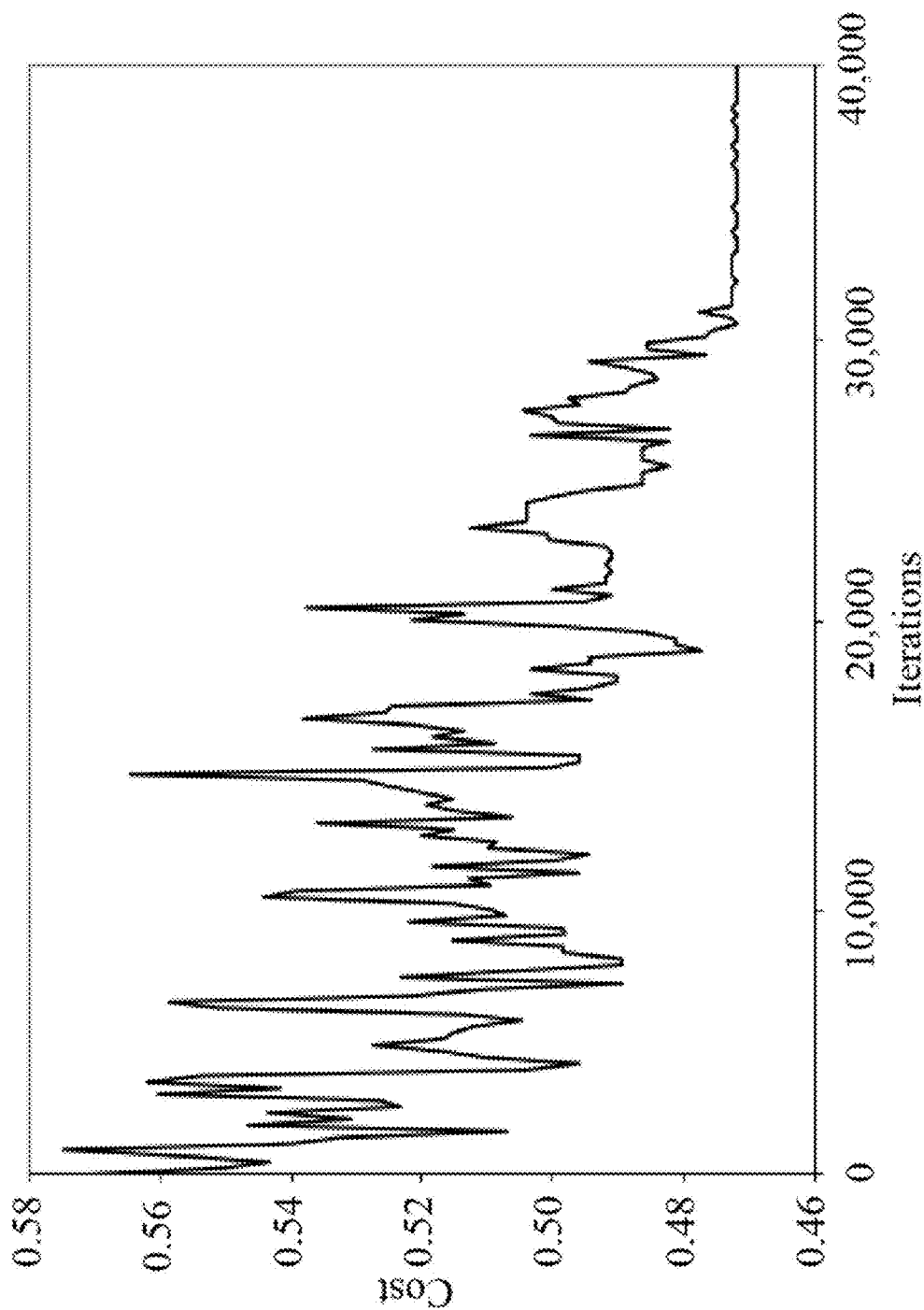
FIG. 5 illustrates a cost function vs. iteration in the optimization of the wayfinding scheme of the city environment as illustrated in FIGS. 4A-4D.
Figure 6A:
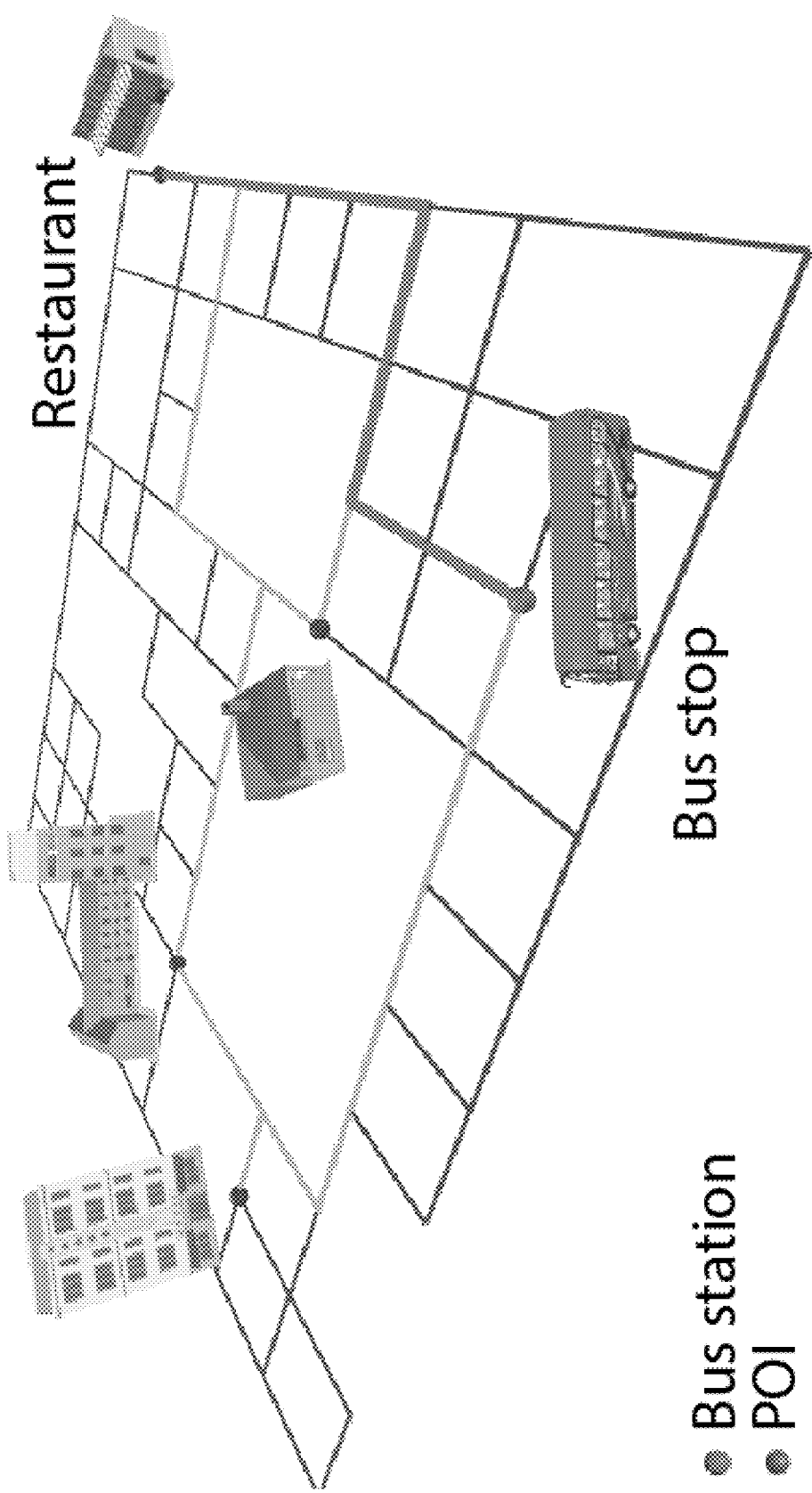
FIG. 6A illustrates a wayfinding scheme generated for the city environment with all source-destination pairs having the same importance value.
Figure 6B:
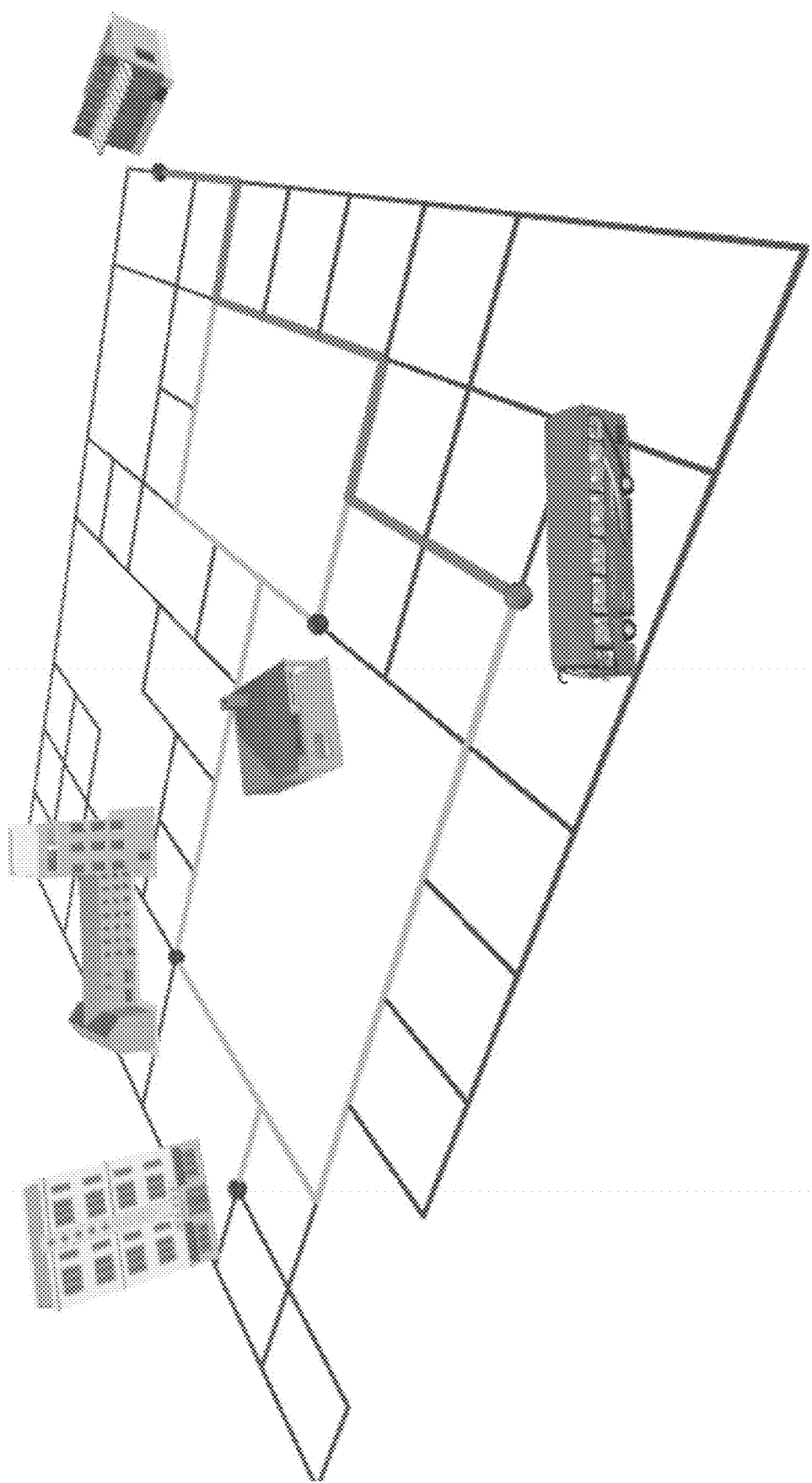
FIG. 6B illustrates a wayfinding scheme generated for a city environment with the (Bus Stop, Restaurant) pair having a lower importance value than other source-destination pairs.

FIGS. 4A-4D show the wayfinding schemes generated over the iterations of the optimization process of the illustrative example in which FIG. 4A illustrates a wayfinding scheme generated at initialization of an optimization of the City environment, FIG. 4B illustrates a wayfinding scheme generated after 5000 iterations of an optimization of the City environment, FIG. 4C illustrates a wayfinding scheme generated after 30,000 iterations of an optimization of the City environment, and FIG. 4D illustrates an optimized result of wayfinding scheme generated in an optimization of the City environment. FIG. 5 shows the decay in cost over the optimization process. Changing the importance values of the source-destination pairs results in wayfinding schemes that are depicted in FIGS. 6A and 6B in which FIG. 6A illustrates a wayfinding scheme generated for the City environment with all source-destination pairs having the same importance value of 0:5, and FIG. 6B illustrates a wayfinding scheme generated for the City environment with the (Bus Stop, Restaurant) pair having a lower importance value of 0:25. In this example, the global path length is improved (i.e., the global path length is shorter) while the local path angle of the path from the Bus Stop to the Restaurant becomes worse (i.e., the path has more orientation changes).

Depending on the number of source-destination pairs |P|, the optimizer may change the selected paths of up to |P| source-destination pairs in a single move. The probability $Pr_x$ of drawing a move to change the selected paths of x pairs is inversely proportional to x, i.e.:

$$Pr_x = \frac{|P| - x + 1}{X},$$

where $$X = \sum_{i=1}^{|P|} i$$

A selected path is randomly changed to another path from the set of k shortest paths of its corresponding source-destination pair.

P may be initialized by randomly selecting a path from one of the k shortest paths for each source-destination pair. By default, k may be adaptively set such that the length of the kth shortest path is just within a predetermined length of the first shortest path between a source-destination pair, for example, 16% of the length of the first shortest path, as research in spatial cognition finds that humans typically choose a path with a length within 16% of that of the shortest path. Unless otherwise specified, each pair may be assigned the same importance value:

$$k_i = \frac{1}{|P|}$$

In one example the weights $\omega_{local}^N$ and $\omega_{local}^N$ to 1, $\omega_{global}^L$ and $\omega_{global}^N$ are set to 5, and $\omega_{local}^A$ is set to 10. These parameters and weights can be adjusted via an interface of a system executing the wayfinding optimization disclosed herein according to domain-specific design needs—a flexibility provided by the optimization-based design framework.

Agent-Based Refinement:

The wayfinding scheme optimization in the previous step produces a wayfinding scheme which comprises paths from the sources to the destinations. A methodology including agent-based refinement provides for automatically defining locations for and/or placing signs for each path to facilitate wayfinding.

Figure 7:
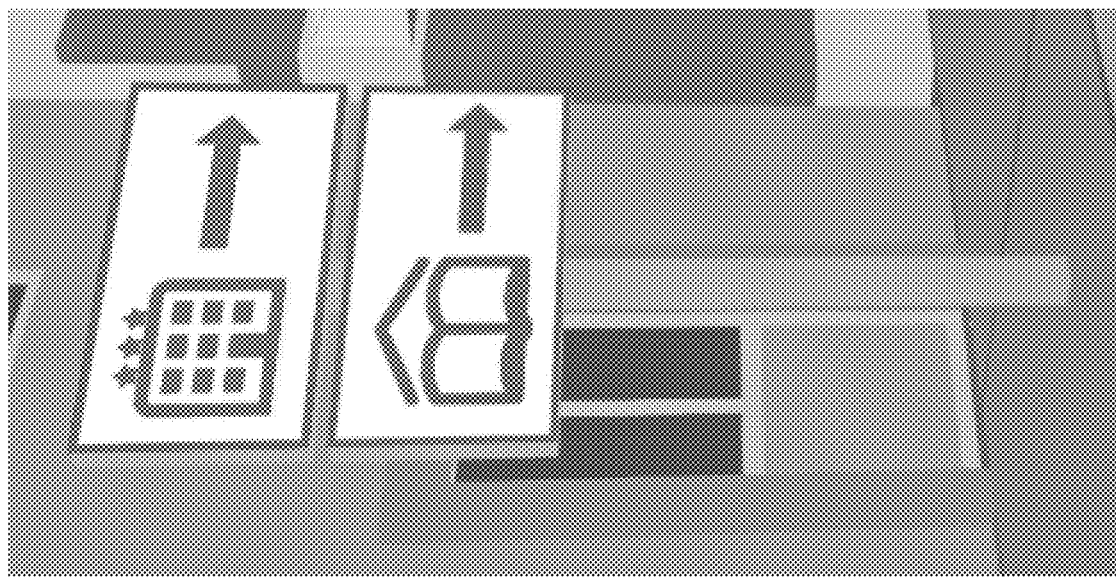
FIG. 7 illustrates an example sign placed at a street corner in the city environment.
Figure 8A:
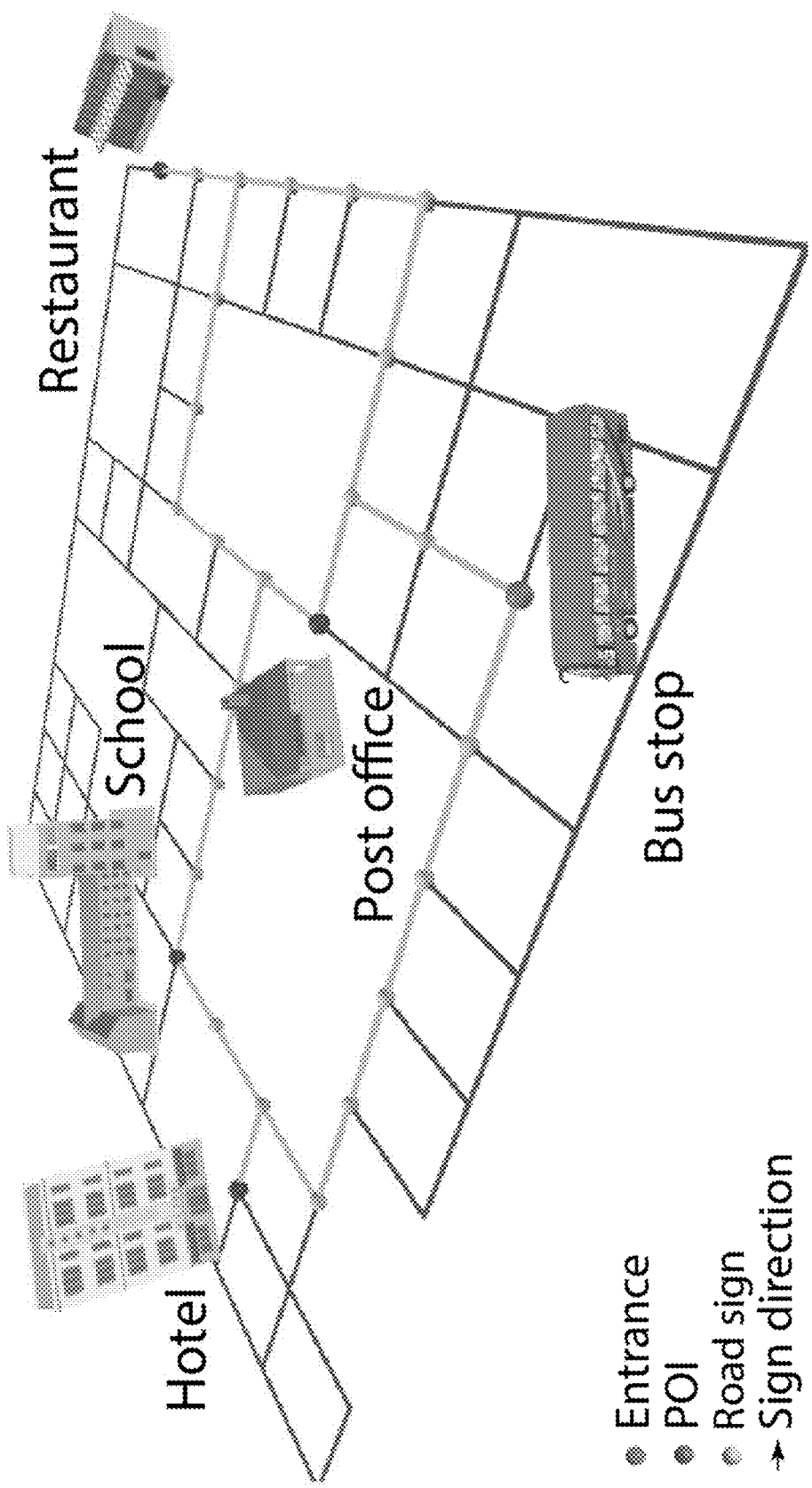
FIG. 8A illustrates sign placement generated at initiation of the optimization in the agent-based sign refinement step in which road signs are placed at every node along the paths generated in the wayfinding scheme optimization step.
Figure 8B:
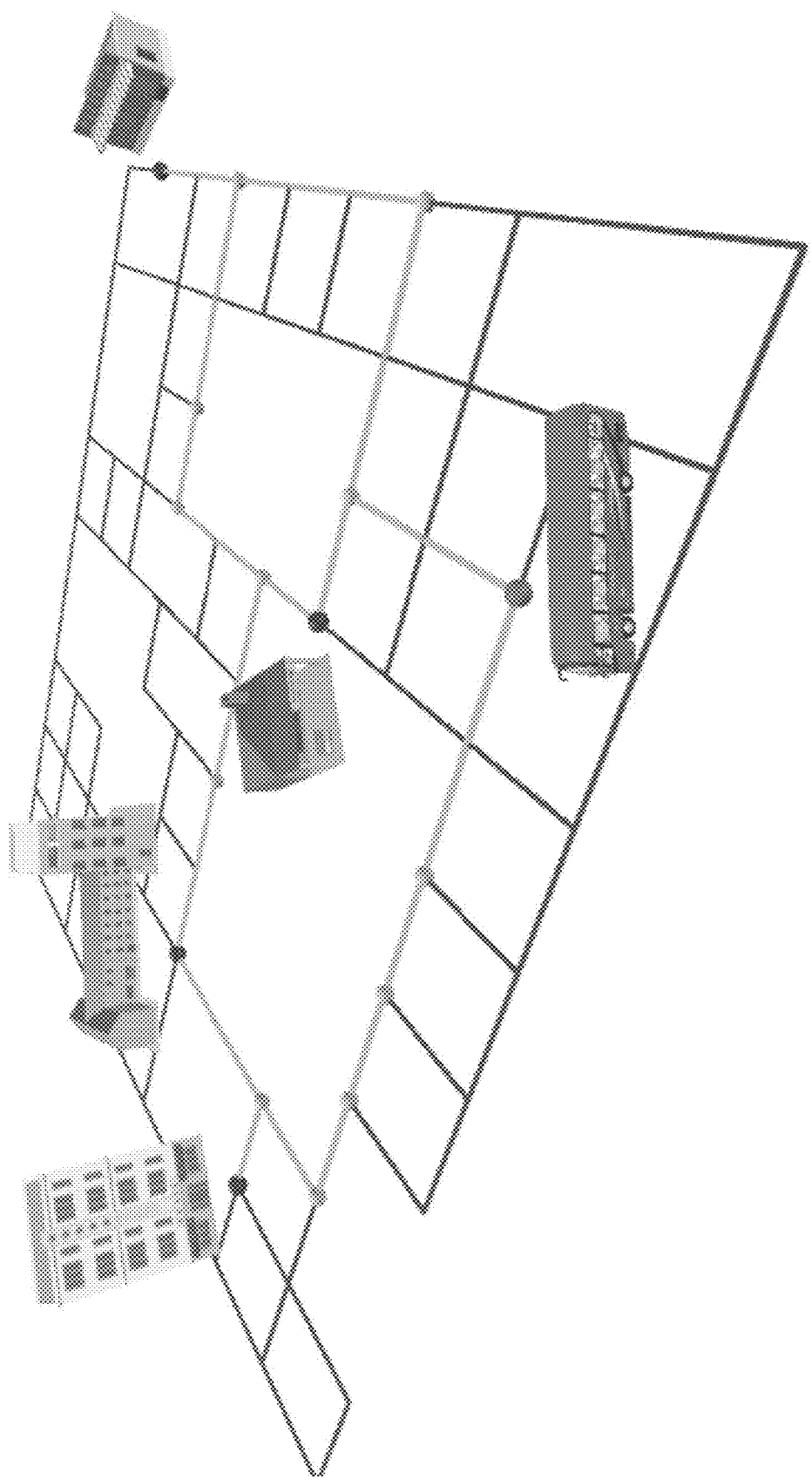
FIG. 8B illustrates sign placement generated after 100 iterations of the optimization in the agent-based sign refinement step in which some redundant road signs have been removed.
Figure 8C:
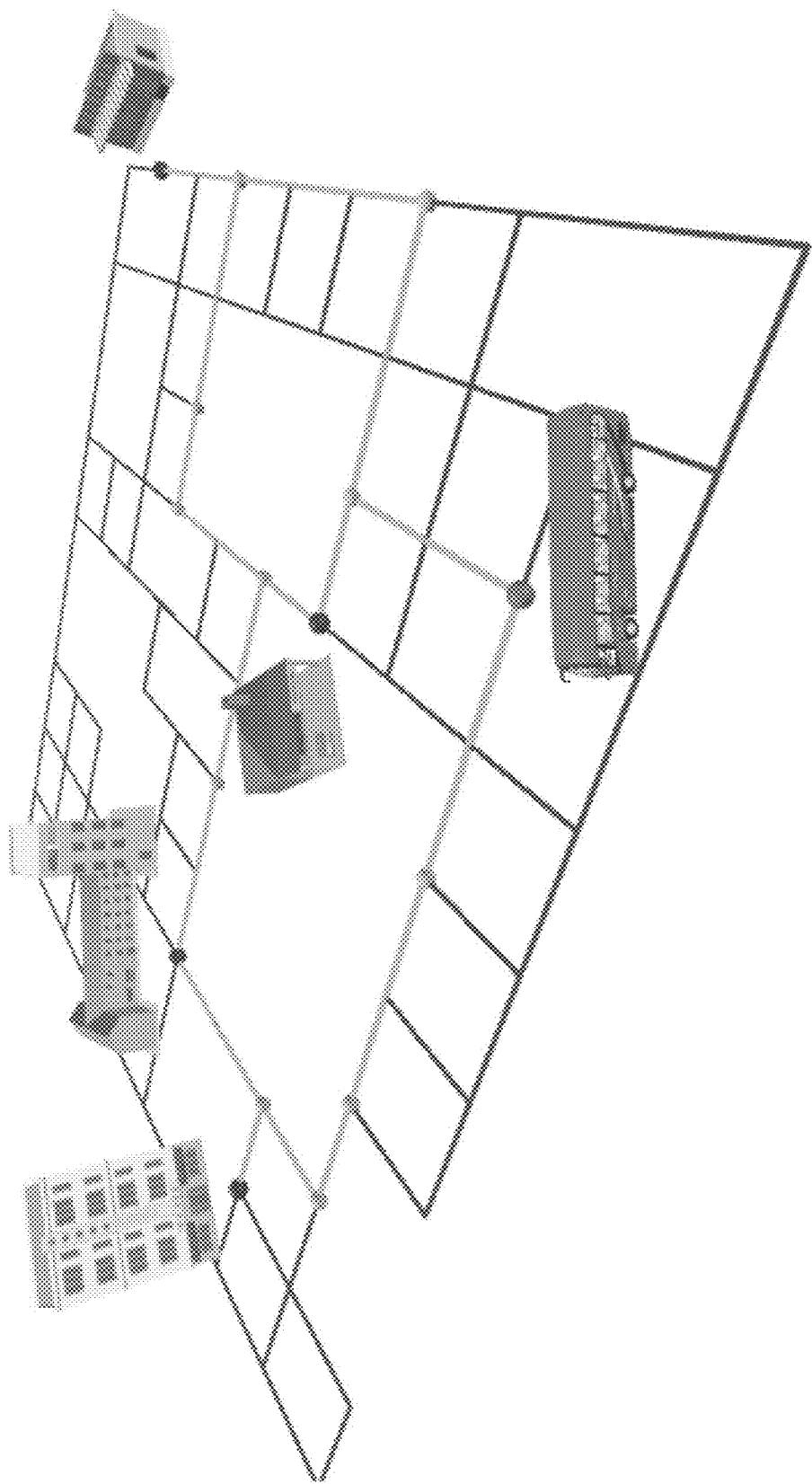
FIG. 8C illustrates sign placement generated after 500 iterations of the optimization in the agent-based sign refinement step in which redundant road signs along the bottom path have been further removed.
Figure 8D:
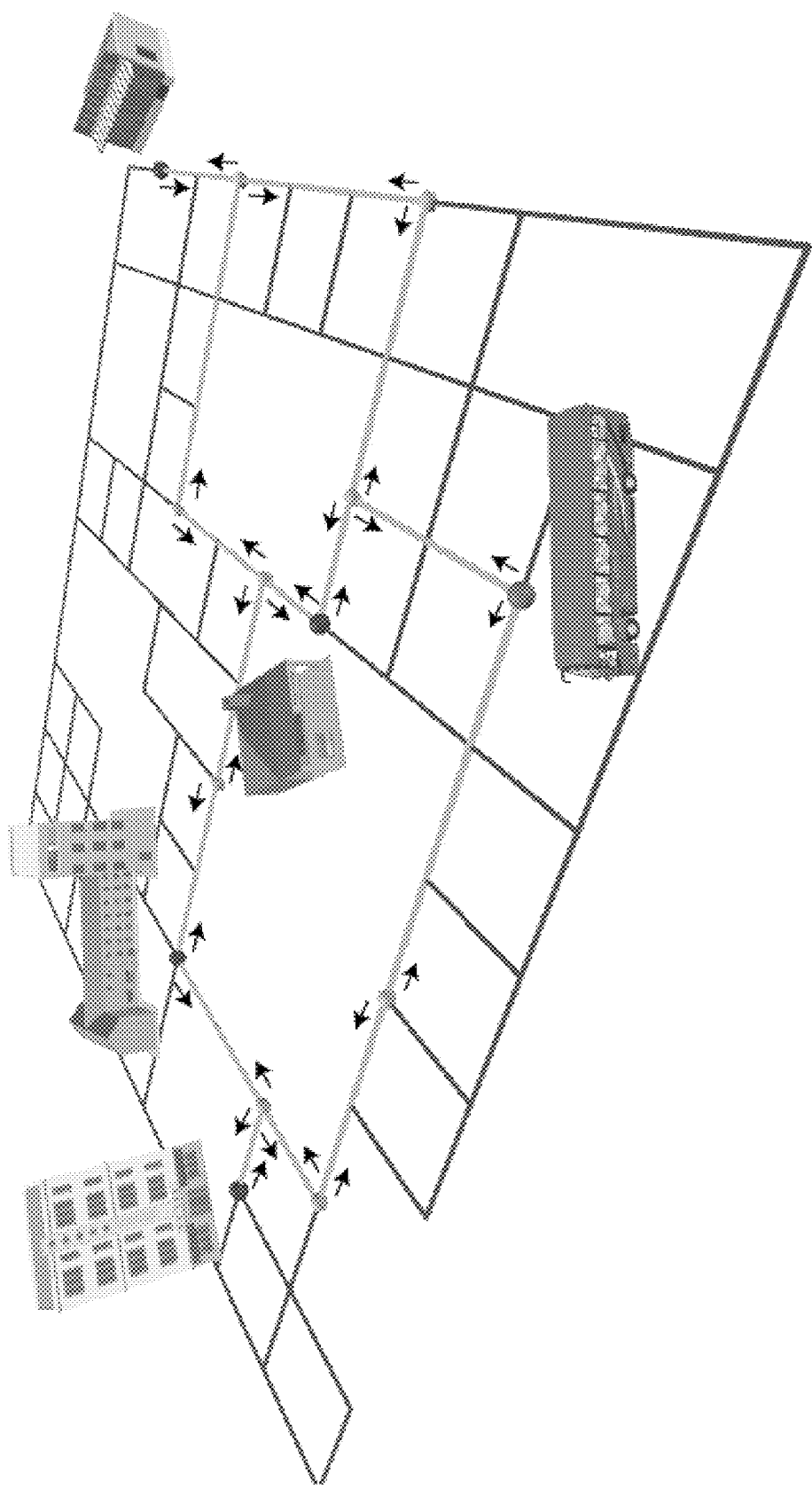
FIG. 8D illustrates sign placement generated after completion of the optimization in the agent-based sign refinement step in which the signs on the bottom path are combined into a single sign placed near the middle of the path and the redundant sign on the upper path has been removed.

Each node along a path corresponds to a decision point where a sign may be placed. In some embodiments, a sign shows an arrow pointing to the next node and the destination's name or symbol. Two or more signs placed at the same node may be combined into a single sign showing multiple pieces of wayfinding information. FIG. 7 shows an example sign placed at a street corner in the City environment.

A trivial yet unrealistic solution is to place a sign showing the direction to the destination at every node along a path, so that a pedestrian walking along the path will keep reassured that he is heading to his destination. However, this solution will involve placing many redundant signs occupying a lot of space and may thus be non-optimal.

Instead, aspects and embodiments of the method disclosed herein includes placing signs at strategic locations according to human vision and navigation properties which are evaluated via agent-based simulations. The sign placement process is performed as an optimization against a number of cost terms reflecting the quality of the wayfinding experience brought about by the signs. The optimization may start with the trivial solution of placing a sign at each node along a path, then iteratively alter the sign placement to optimize the costs.

One advantage of this approach compared to the alternative approach of iteratively adding signs from scratch is that the optimization process of this approach is much more tractable, because the initial solution and each intermediate solution represent a feasible wayfinding solution even though they may contain redundant signs and the sign distribution may not be ideal. This approach allows the optimizer to progress stably and conservatively to achieve a refined sign placement solution effectively.

A sign placement solution refers to placing signs at certain nodes of the input layout. Given the path of each source-destination pair, a good sign placement solution guides each pedestrian to walk from the source to the destination through the path effectively. Note that there could exist multiple reasonable sign placement solutions. The goal is to identify one of such solutions through an optimization.

In case a road connecting two adjacent nodes is long, it may be desirable to place signs at some intermediate locations along the road to reassure the pedestrian about his walking direction. Therefore, for roads longer than a distance threshold dr, embodiments of the approach add extra nodes between the two end nodes of the road in a preprocessing step, such that the distance between any two adjacent nodes is shorter than dr. These extra nodes may be placed, for example, intermediate between the previously existing nodes defining the undesirably long road. These extra nodes serve as additional potential locations for placing signs. dr can be empirically set by the designer depending on how frequently a pedestrian should be reassured about his direction. For example, for a subway station, the designer can use a smaller dr such that more signs will be generated along a long road to reassure pedestrians that they are walking towards a desired destination (e.g., a platform). In an example of the City environment, dr may be set to be 50 meters.

More specifically, given the graph G={V, E} representing the input layout, V may be extended to V' to include the extra nodes added. A sign placement solution is represented by S={($v_i$, $\Phi_i$)}, where $v_i \in V'$ is the node at which sign $\Phi_i$ is placed. $\Phi_i$ contains the sign's attributes such as its arrow direction and the name of the destination it is referring to. Embodiments of the optimization search for a desirable sign placement solution S* by minimizing a total cost function $C_{all}^S(S)$:

$$C_{all}^S(P) = \omega_{sign}^N C_{sign}^N + \omega_{sign}^D C_{sign}^D + \omega_{sign}^F C_{sign}^F,$$

where $C_{sign}^N$ and $C_{sign}^D$ are regularization costs and $C_{sign}^F$ is the agent-based simulation cost for estimating the way-finding failure induced by the sign placement solution S. $\omega_{sign}^N$, $\omega_{sign}^D$, and $\omega_{sign}^F$ are the weights of the cost terms, which, in one example, are respectively set as 1, 1, and 10 by default, although different weights may be selected based on different factors as described further below.

In some embodiments, the cost function $C_{all}^S(S)$ includes a cost term to regularize the number of signs in the sign placement solution, to penalize the existence of redundant signs:

$$C_{sign}^N(S) = \frac{N(S)}{|V'|},$$

where N(S) is the number of placed signs; |V'| being the total number of nodes (i.e., potential locations for placing signs) is a normalization constant.

In a real-world design, signs are often evenly distributed along a path, which serve the purpose of regularly reassuring a pedestrian about his direction towards the destination. Accordingly, embodiments of the method may include a cost term in the cost function $C_{all}^S(S)$ to regularize the distribution of signs:

$$C_{sign}^D(S) = \frac{1}{|P|} \sum_{p \in P} \frac{\sigma(p)}{L(p)},$$

where |P| is the number of source-destination pairs; $\sigma(p)$ is the standard deviation of the distances between any two adjacency signs on path p, and L(p) is the length of path p.

The placed signs should effectively guide the pedestrians from the sources to the destinations. Embodiments of the method may include a cost term in the cost function $C_{all}^S(S)$ to penalize wayfinding failure:

$$C_{sign}^F(S) = \begin{cases} F(S) & \text{if } F(S) \leq \mu, \\ +\infty & \text{otherwise}, \end{cases}$$

where F(S) is the percentage of agents who fail to reach their destinations under the current sign placement S. F(S) may be obtained by performing an agent-based simulation with sign placement S. $\mu$ is a failure tolerance level specified by the designer, which, in one example, may be set as 20% by default or to other values based on various factors as described further below.

In each iteration of the optimization, an agent-based simulation may be employed to evaluate the wayfinding experience under the current sign placement S, to obtain F(S) used for computing the wayfinding failure cost.

Each agent mimics a pedestrian walking from a source to a destination. Each agent may be modeled with wayfinding behavior according to Montello and Sas (D. Montello and C. Sas, Human Factors of Wayfinding in Navigation. CRC Press/Taylor & Francis, Ltd., 2006, pp. 2003-2008). The agent starts from the source. It can see any unoccluded sign within visible distance dv. Whenever it sees a sign pointing to its destination, it will follow the sign to choose a direction to walk. If it arrives at an intersection but is unsure about which road to take out of several roads connected to that intersection, it will randomly choose a road to walk with equal probability. To more realistically model mistakes that humans can make throughout a navigation, each agent has a probability Prmiss of missing a sign even within sight.

For each source-destination pair, a plurality of agents, for example, 100 agents are employed to walk from the source to the destination using the agent model described. At the end of the simulation, the number of agents that can successfully reach their destinations are counted, and hence F(S) is computed.

A "success" is defined as follows: let db be the "baseline" walking distance from the source to the destination if no mistake is made (i.e., Prmiss=0) under full sign placement (i.e., a sign is placed at every node along a path). If an agent, given the chances of making mistakes and under the current sign placement S, can walk from the source to the destination by a distance no longer than λdb, the navigation is considered as a success. The navigation is counted as a failure otherwise. In some embodiments λ may be set to 1.5, although other values of λ may be used based on various factors as described further below.

In some embodiments, the optimization is initialized with the full sign placement solution, i.e., a sign is placed at every node along the path from the source to the destination of each source-destination pair. Although this sign placement can lead the pedestrians to their destinations, it consists of a lot of redundant signs that could be removed without affecting the pedestrians' ability to find their ways. A stochastic, agent-based optimization may be applied to search for a reasonable sign placement solution.

The optimization proceeds iteratively. At each iteration, a move is randomly proposed to alter the sign placement solution whose quality is evaluated using the total cost function $C_{all}^S(S)$. The moves may include: adding 1 or 2 signs to 1 or 2 source-destination pairs; removing 1 or 2 signs from 1 or 2 pairs; or moving a sign from one node to another node of a source-destination pair.

The proposed solution is accepted with an acceptance probability determined by the Metropolis criterion as described by the equation for Pr(P'|P) above, using $C_{all}^S(S)$ as the cost function. The optimization terminates if the absolute change in cost is less than a predetermined amount over a predetermined number of iterations, for example, 1% over 50 iterations.

FIGS. 8A-8D shows the sign placement over iterations for one illustrative example. In this example, the source-destination pairs include walking from the Bus Stop to each POI, and walking between every pair of POIs.

Example

Applicants implemented the disclosed approach as a plugin for the Unity 5 game engine using C #, which level designers can use to create a wayfinding scheme of a given layout. Experiments evaluating the performance of the disclosed approach were run using a Macintosh computer equipped with a 2:3 GHz Intel Core i7 processor and 8 GB of RAM. Generating a wayfinding scheme for a layout similar to the illustrative example, City, takes about 40 seconds current implementation.

Figure 9A:
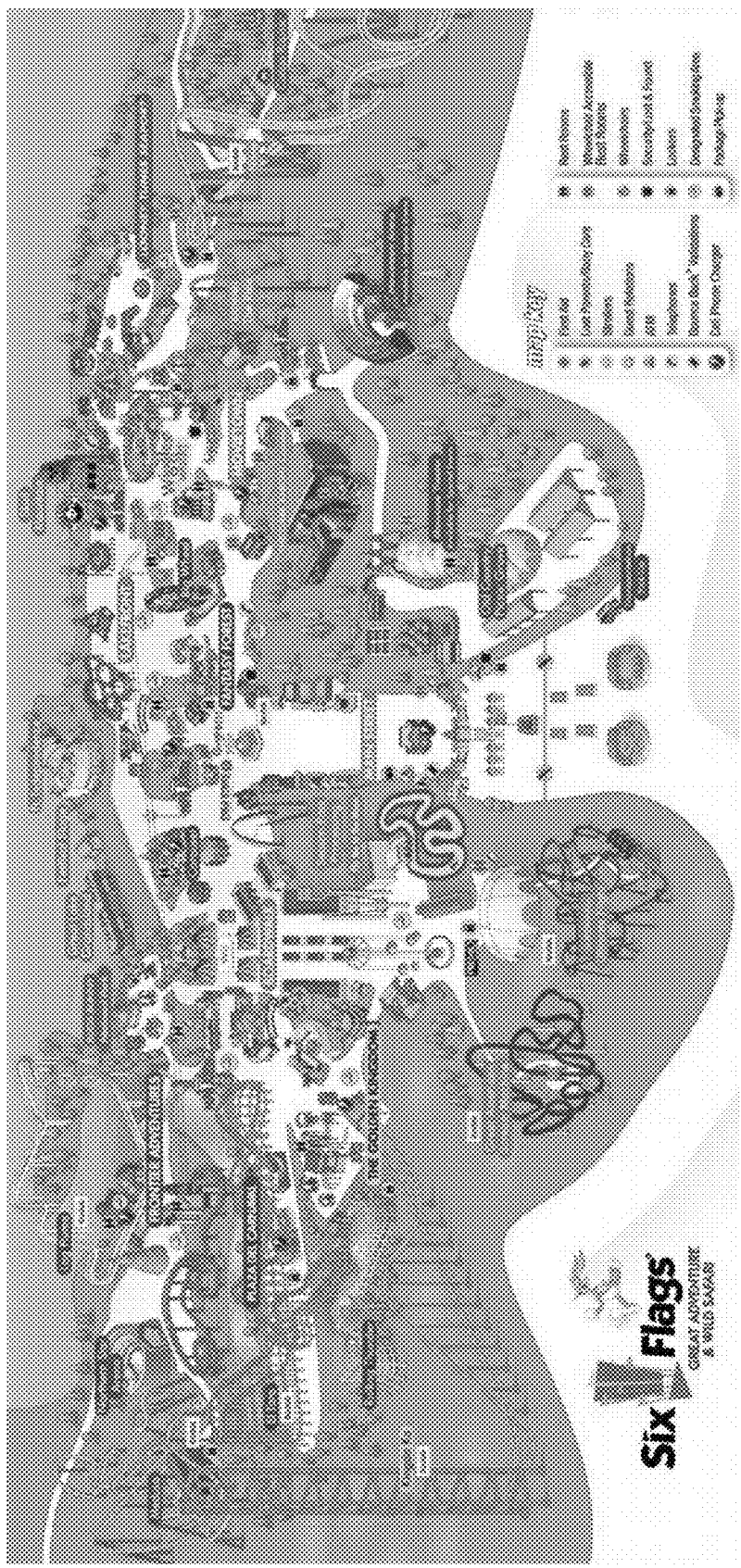
FIG. 9A illustrates a map of an example amusement park.

The disclosed approach was utilized to generate wayfinding designs for different layouts: Amusement Park, Downtown, and Penn Station. FIGS. 9A, 10A, and 11A shows the maps from which the layouts are extracted following the procedure described above. FIGS. 9B and 9C, 10B and 10C, and 11B and 11C show the wayfinding designs that were generated.

Amusement Park Example

The layout of an amusement park, Six Flags New England, was used as input (see FIG. 9A). The POIs, which in this example are the Entrance, Sky Screamer, Bonsai, Batman, and Picnic Grove, represent the popular spots the visitors would like to visit. The source-destination pairs involve all pairs of entrances and popular spots, and all pairs of popular spots. In addition to the popular spots, street performances and stalls in the park, which might distract visitors from navigating to their destinations, are expected. To model such distractions, the missing chance Prmiss in the agent simulation of the sign placement optimization step was set to a relatively high level of 0.2. It was assumed that visitors highly prefer to walk shorter and more direct paths to their destinations if possible, therefore, larger values of 5 were used for the weights $\omega_{local}^L$ and $\omega_{local}^N$ of the local path length and local path node costs.

Figure 9C:
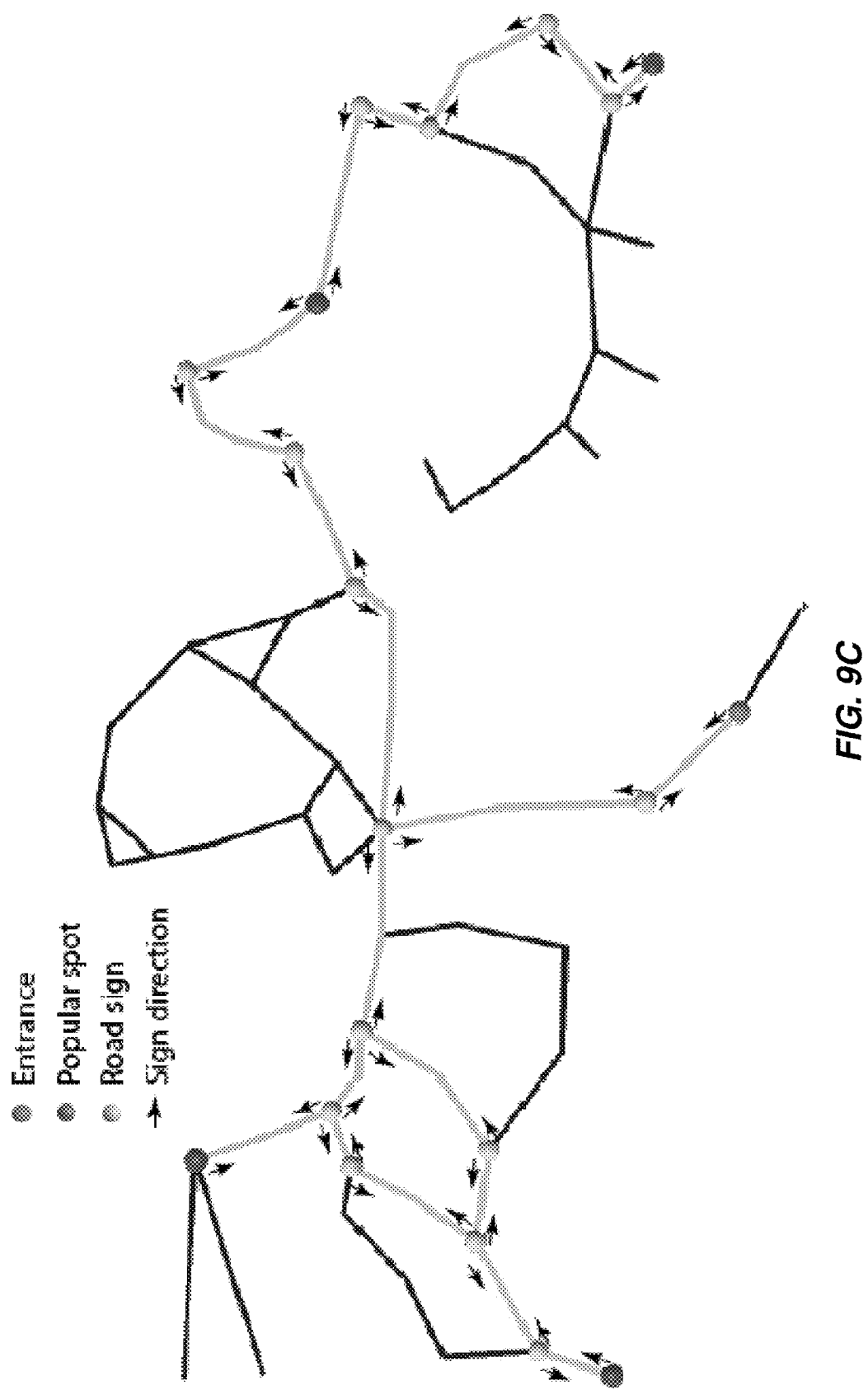
FIG. 9C illustrates a wayfinding design generated for the amusement park layout of FIG. 9B.
Figure 10A:
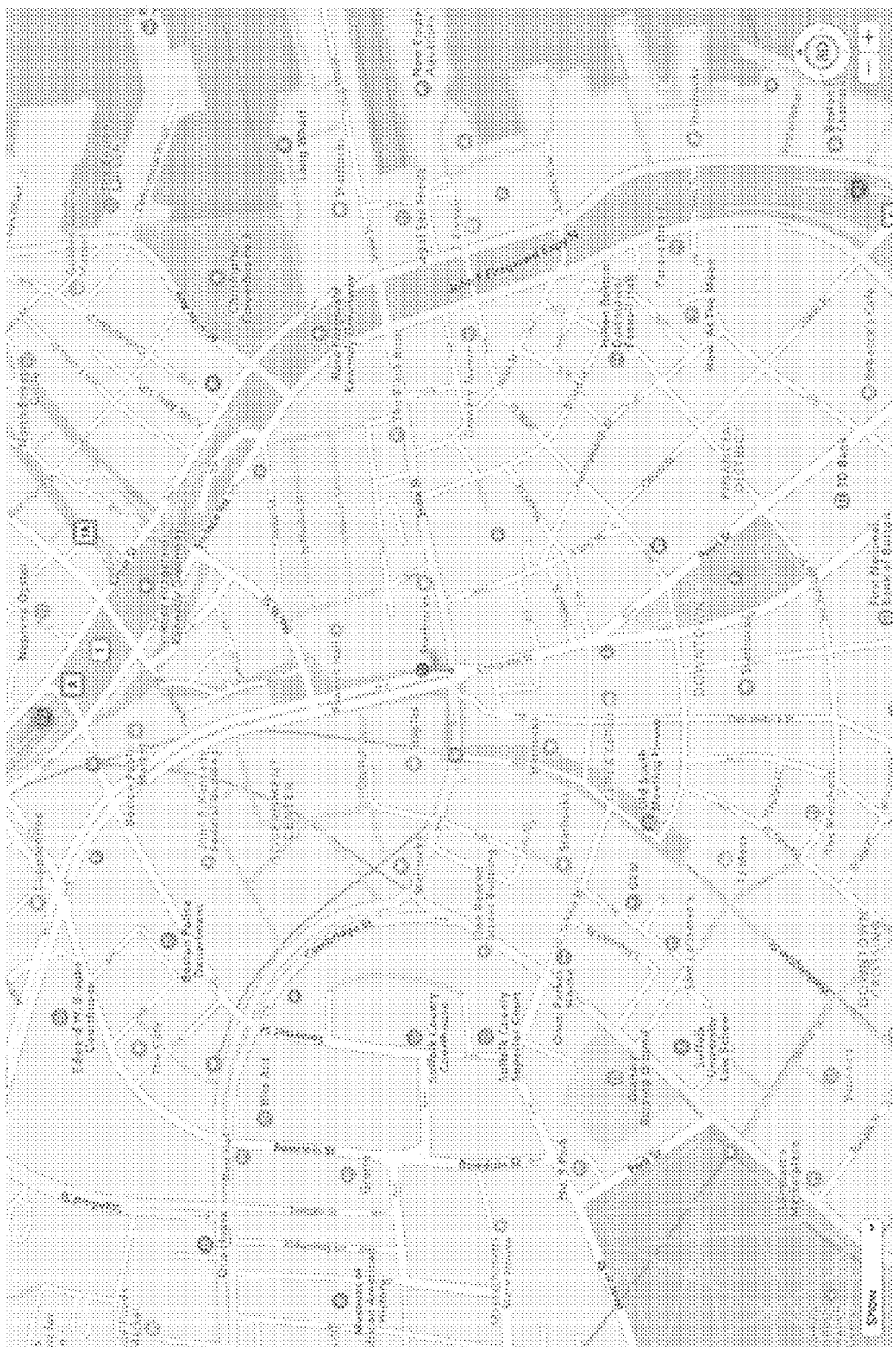
FIG. 10A illustrates a map of downtown Boston.
Figure 10B:
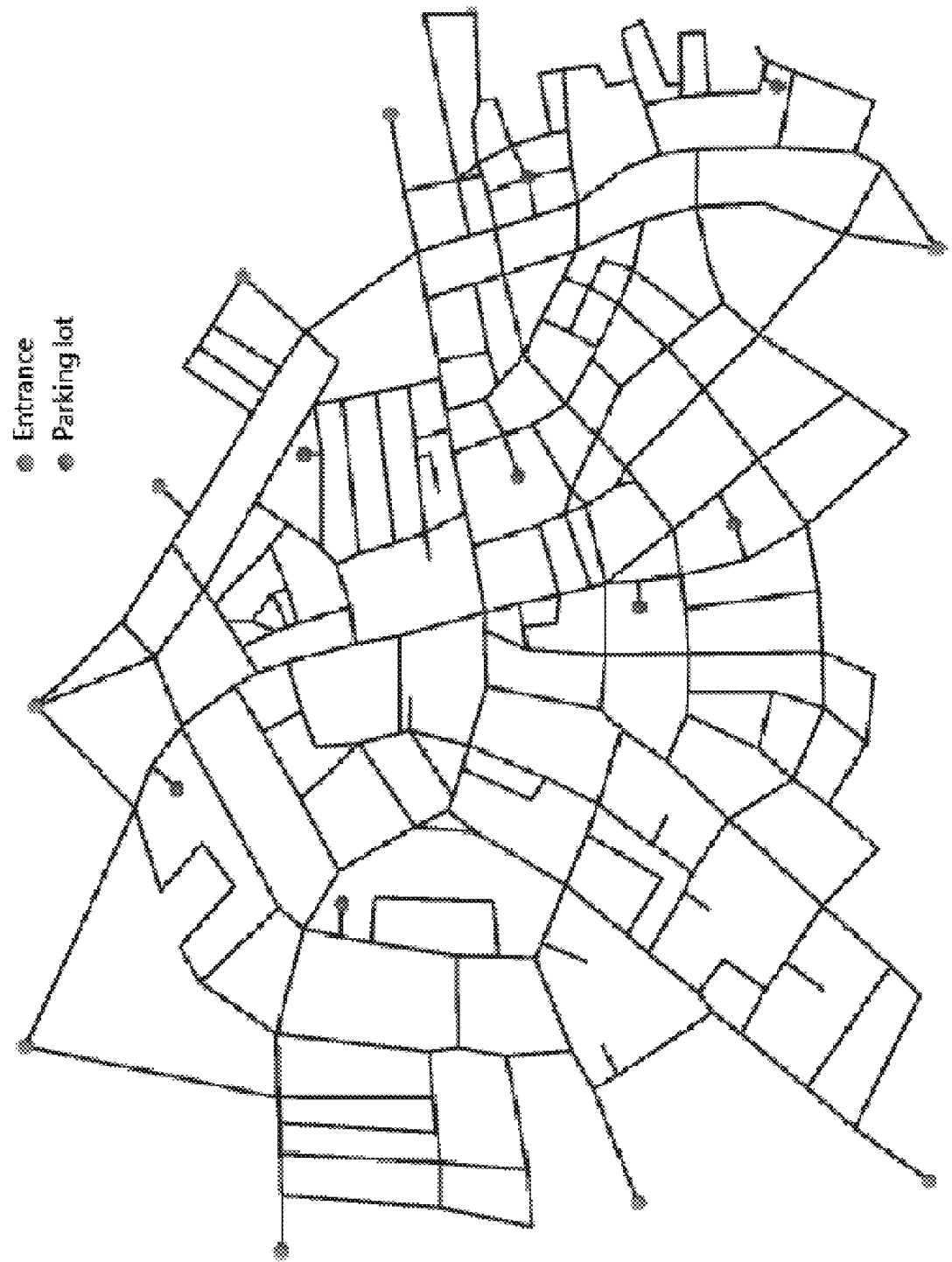
FIG. 10B illustrates a layout extracted from the map of downtown Boston of FIG. 10A.

FIG. 9C shows the generated design. The approach generates a path for each source-destination pair. It places road signs densely at each intersection along the paths to ensure the robustness of the wayfinding system. The left-hand side of the layout shows a shortcut generated which is part of the paths from the popular spot at the lower left to the popular spots on the right. The shortcut allows visitors to walk shorter paths to their destinations, and is also more direct for the visitors as it passes through fewer intersections (2 instead of 3) compared to the alternative path above.

Downtown Example

This example uses the layout of Downtown Boston as input. The goal is to place road signs that guide drivers to an available parking lot nearby. The entrances refer to the major roads through which most cars enter the Downtown area. The POIs are the parking lots, which are placed at the same locations as the real parking lots. All the parking lots were assumed to be run by the same company, hence there are signs showing the way from one parking lot to a nearby parking lot within 0.2 mile, such that if a parking lot is full the driver can follow the signs to a nearby parking lot. Accordingly, the source-destination pairs are defined to connect each entrance to its nearest parking lot, as well as to connect each parking lot to its nearby parking lot. The latter type of pairs are given a relatively larger importance value ($\kappa_p$=0.8 instead of 0.5 given to other pairs), so that the system will prefer to find shorter paths passing through fewer intersections for the paths that connect one parking lot to a nearby parking lot, to help drivers to get to an alternative parking lot more easily in case a parking lot is full.

Figure 10C:
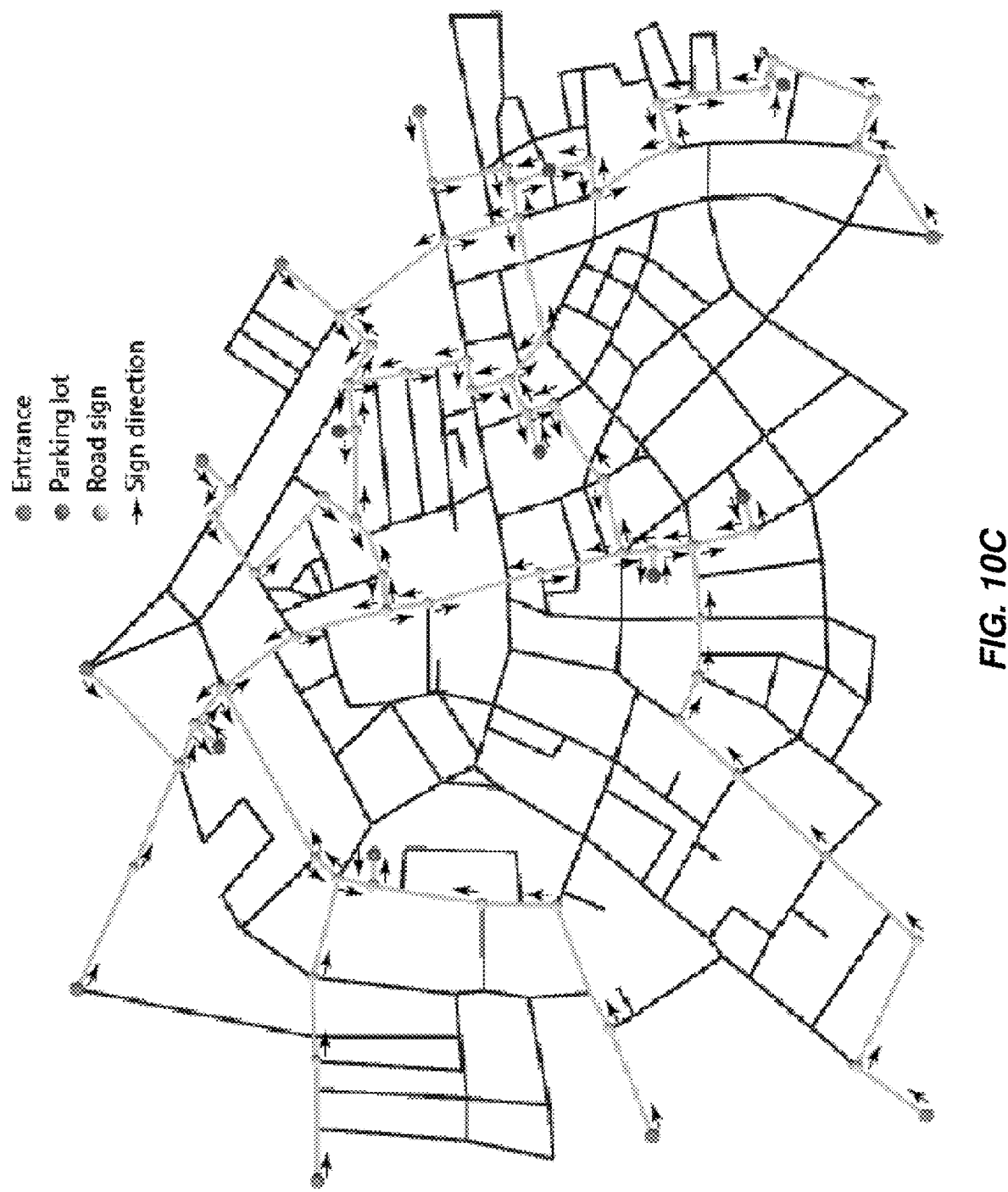
FIG. 10C illustrates a wayfinding design generated for the downtown Boston layout of FIG. 10B.
Figure 11A:
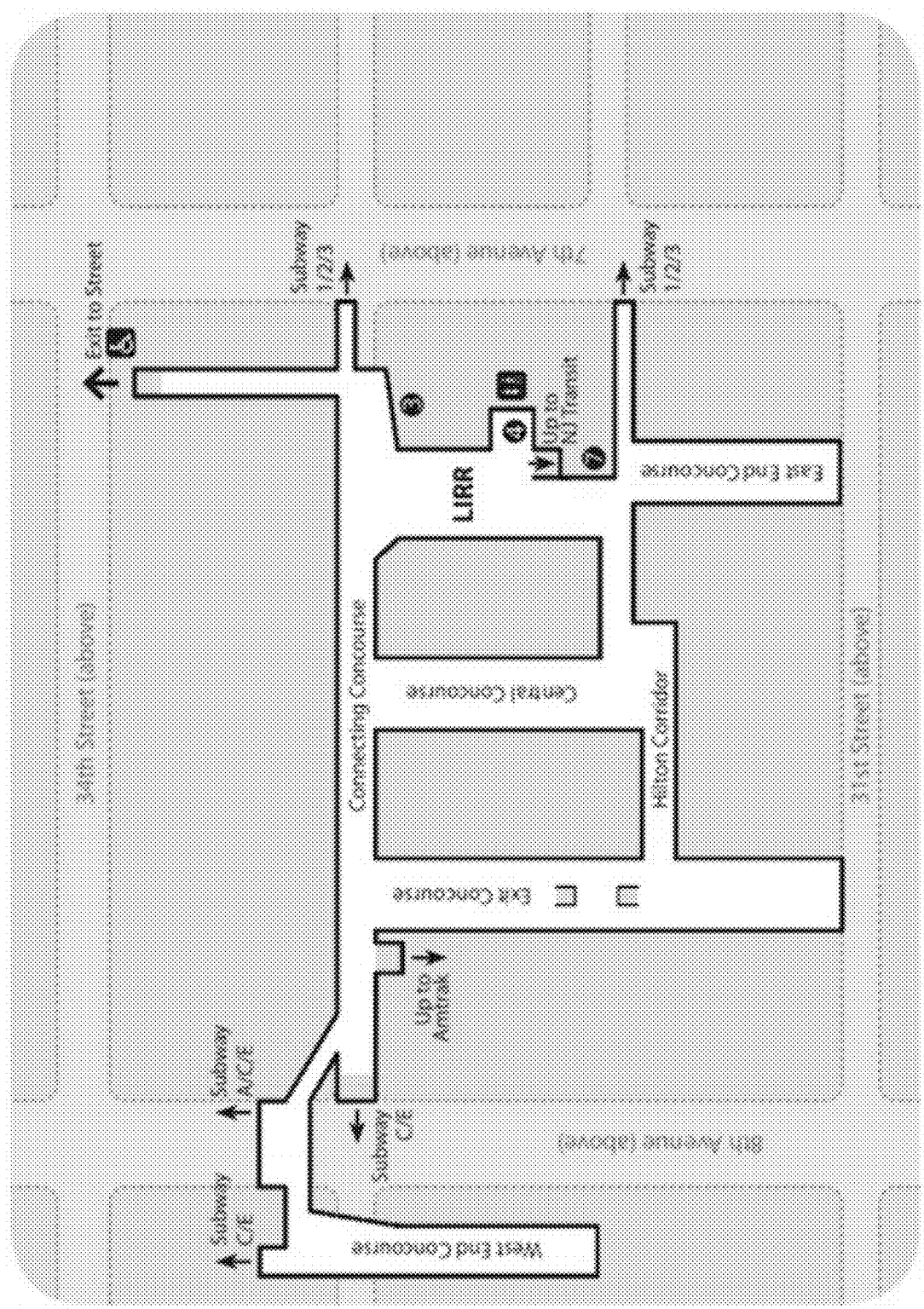
FIG. 11A illustrates a map of the Penn Station subway station.
Figure 11B:
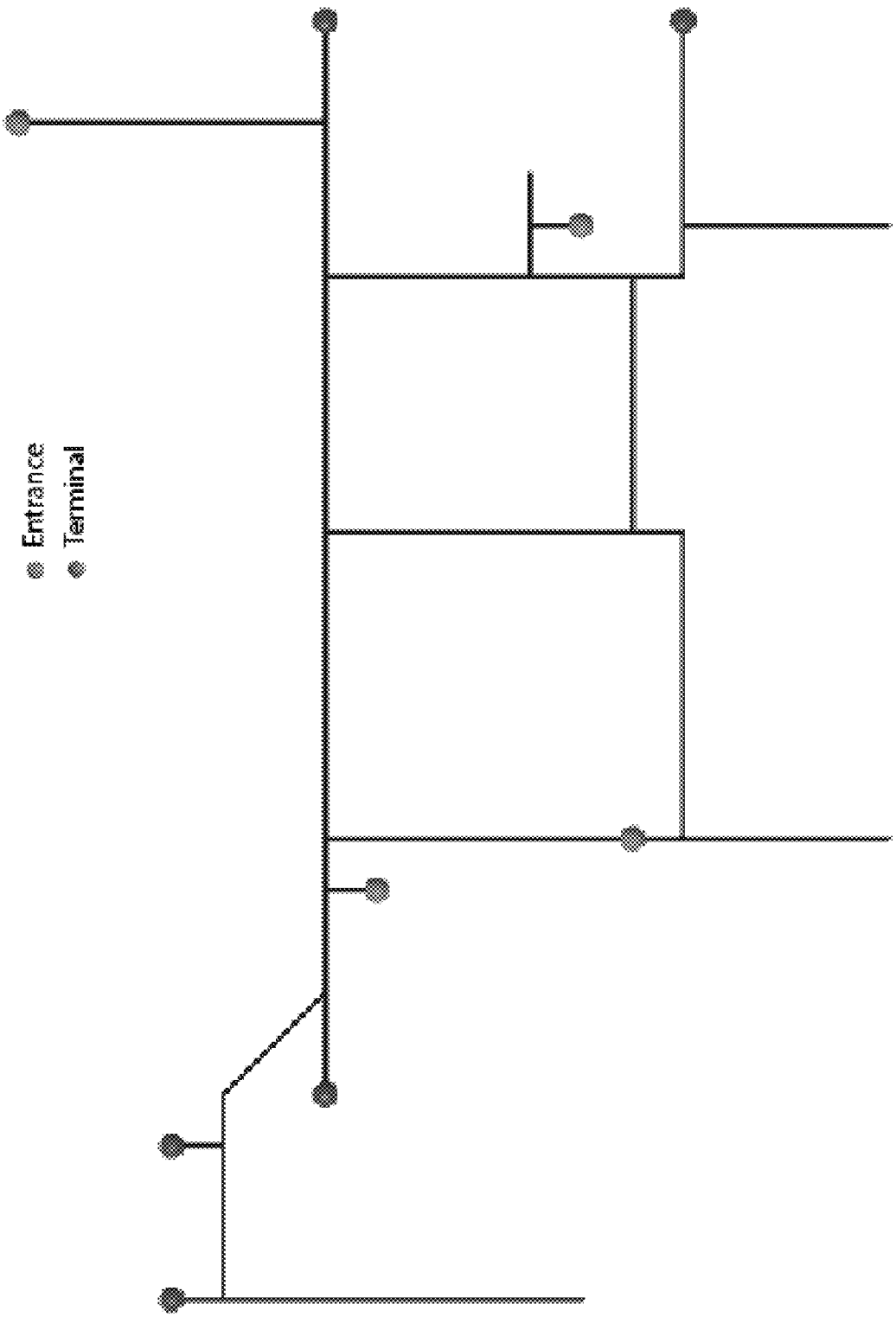
FIG. 11B illustrates a layout extracted from the map of the subway station of FIG. 11A.

FIG. 10C shows the generated design. A path is generated to connect each entrance to its nearest parking lot. Short and direct paths are also generated to connect parking lots to nearby parking lots. While there are many possible paths that can be chosen as the layout comprises a network of many streets, the approach chooses paths which are straight and consists of few turns, as the local path node cost penalizes the inclusion of intersections and the local path angle cost discourages orientation changes.

Penn Station Example

Figure 11C:
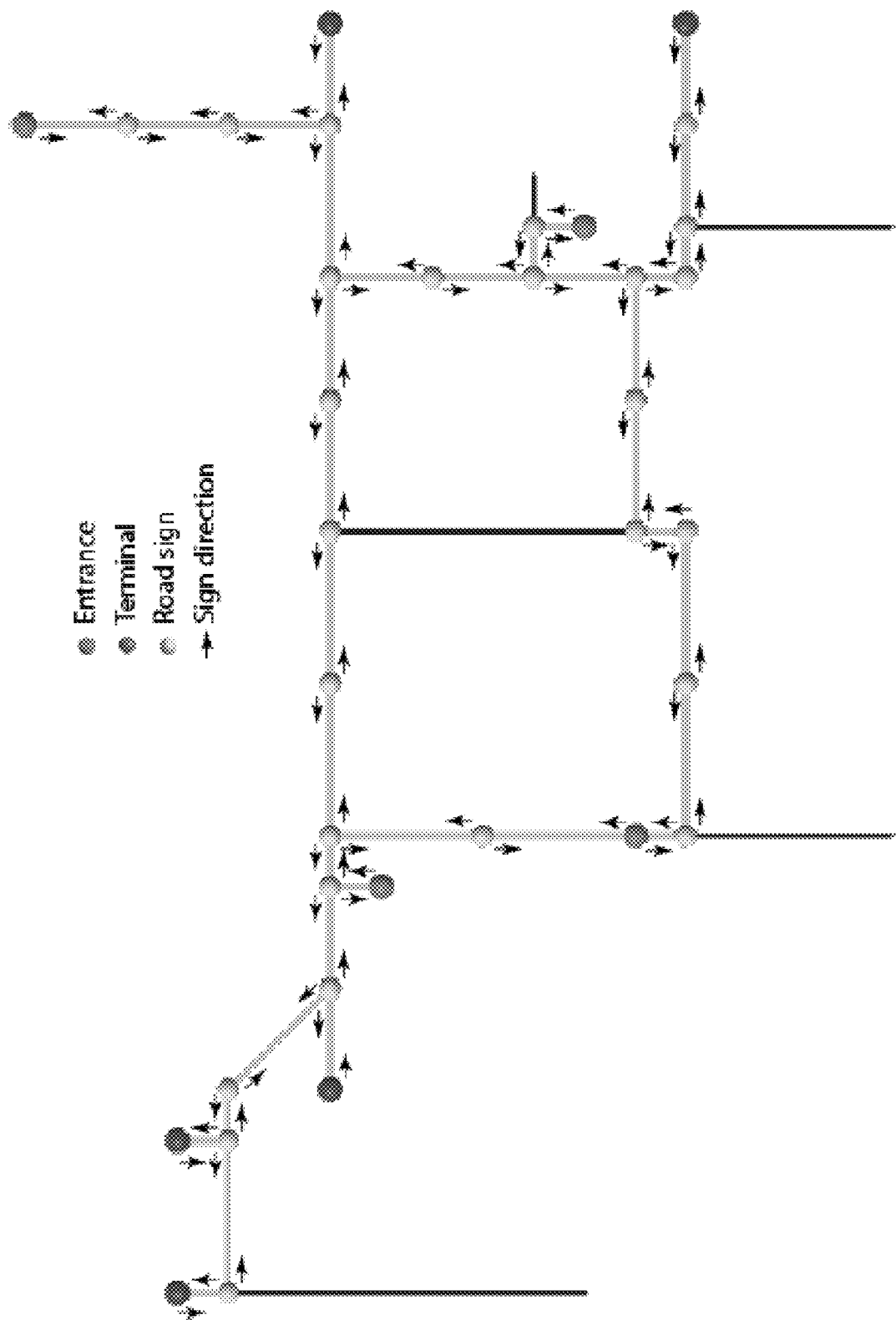
FIG. 11C illustrates a wayfinding design generated for the subway station layout of FIG. 11B.

This example uses the lower level of the Penn Station as input. In this example, the entrances refer to the gates and the stairs from the upper level. The POIs refer to the terminals. The source-destination pairs include every pair of entrance and terminal, and every pair of terminals (for modeling the situations where a passenger wants to transfer from one terminal to another terminal). As the station is expected to be crowded, the visibility dv of the agents is set to a relatively low value of 10 meters to account for the occlusion by the human crowd, and the miss chance $Pr_{miss}$ is set to a relatively high level of 0.2. FIG. 11C shows the generated wayfinding design. The road signs are placed densely and are also placed at non-intersection nodes, to counteract the higher miss chance by reassuring pedestrians about their directions.

Figure 12A:
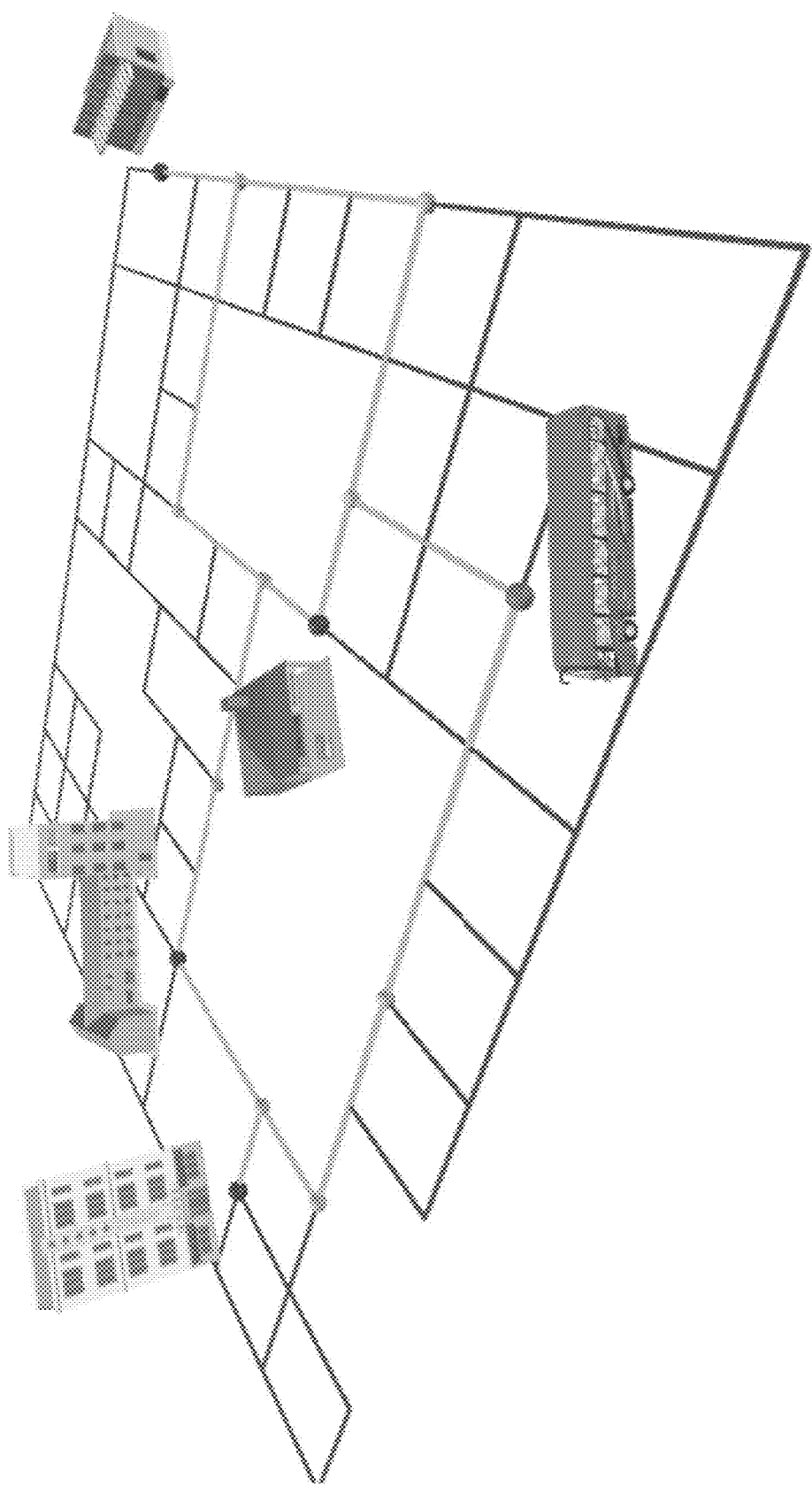
FIG. 12A illustrates the results of an agent-based sign placement step in the city environment with default parameters in which roads that belong to a path of the wayfinding scheme are shown in yellow.

Changing Agent Parameters:

Further experiments were performed by changing the parameters of the agent-based sign placement process using the City layout. In the default settings, the missing chance Prmiss is set to 0%, the weight $\omega_{sign}^F$ of the wayfinding failure cost term is set to 10 and the visibility distance dv is set to 125 meters. FIG. 12A shows the resulting sign placement generated with the default parameters.

Figure 12B:
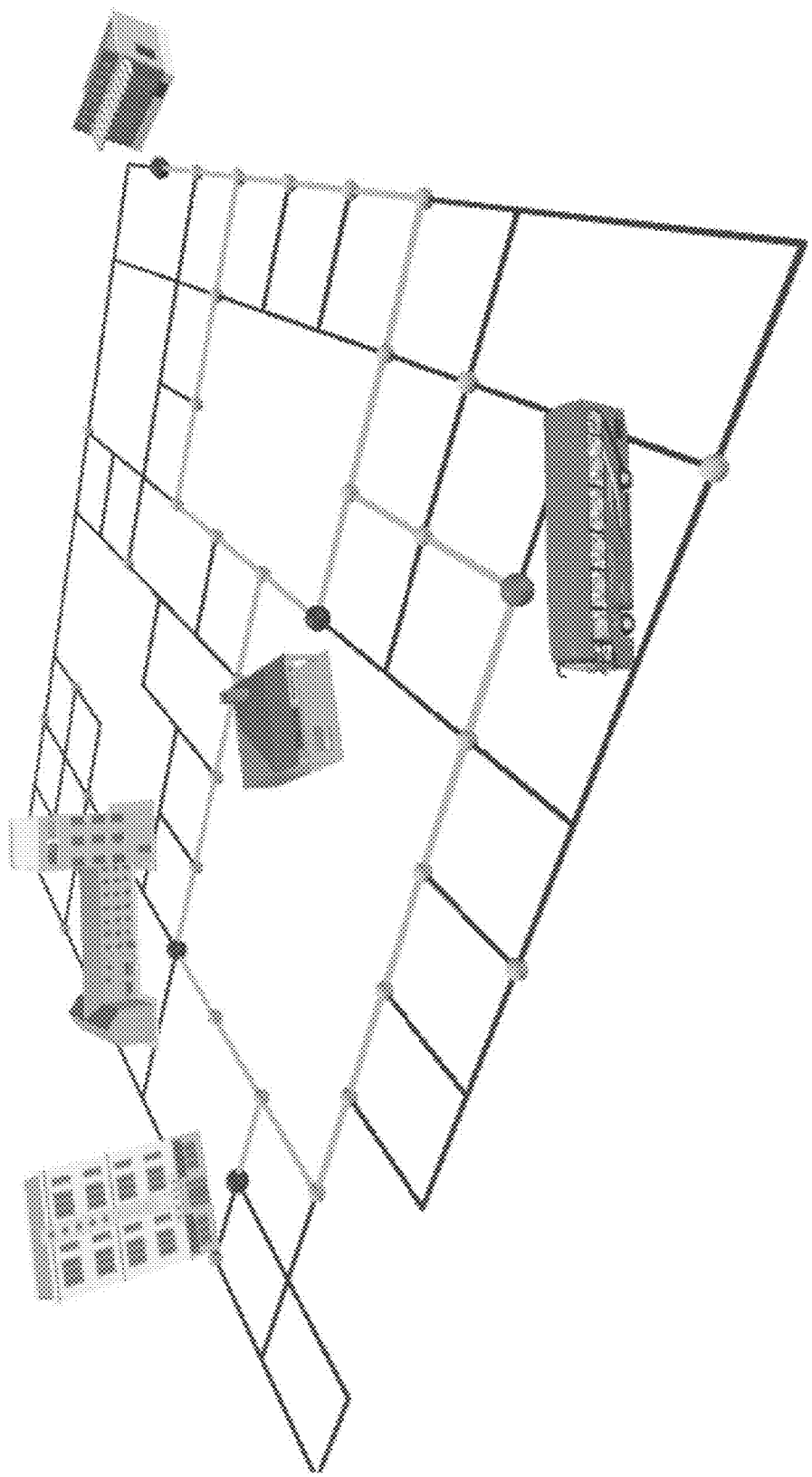
FIG. 12B illustrates the results of an agent-based sign placement step in the city environment with parameters adjusted to reflect a high chance of a pedestrian missing a wayfinding sign in which blue lines indicate the roads that the pedestrians have walked but do not belong to any path.

In one experiment the missing chance Prmiss was increased to 10%. FIG. 12B shows the resulting sign placement. The system places more signs so as to increase the robustness of the wayfinding design against navigation mistakes. In addition, some signs are placed on the roads not belonging to any path for guiding the agents back to the correct paths. The generated wayfinding design is more robust against navigation mistakes. Signs are placed densely and are also placed on some roads not belonging to any path to guide the pedestrians back to the correct paths in case they get lost.

Figure 12C:
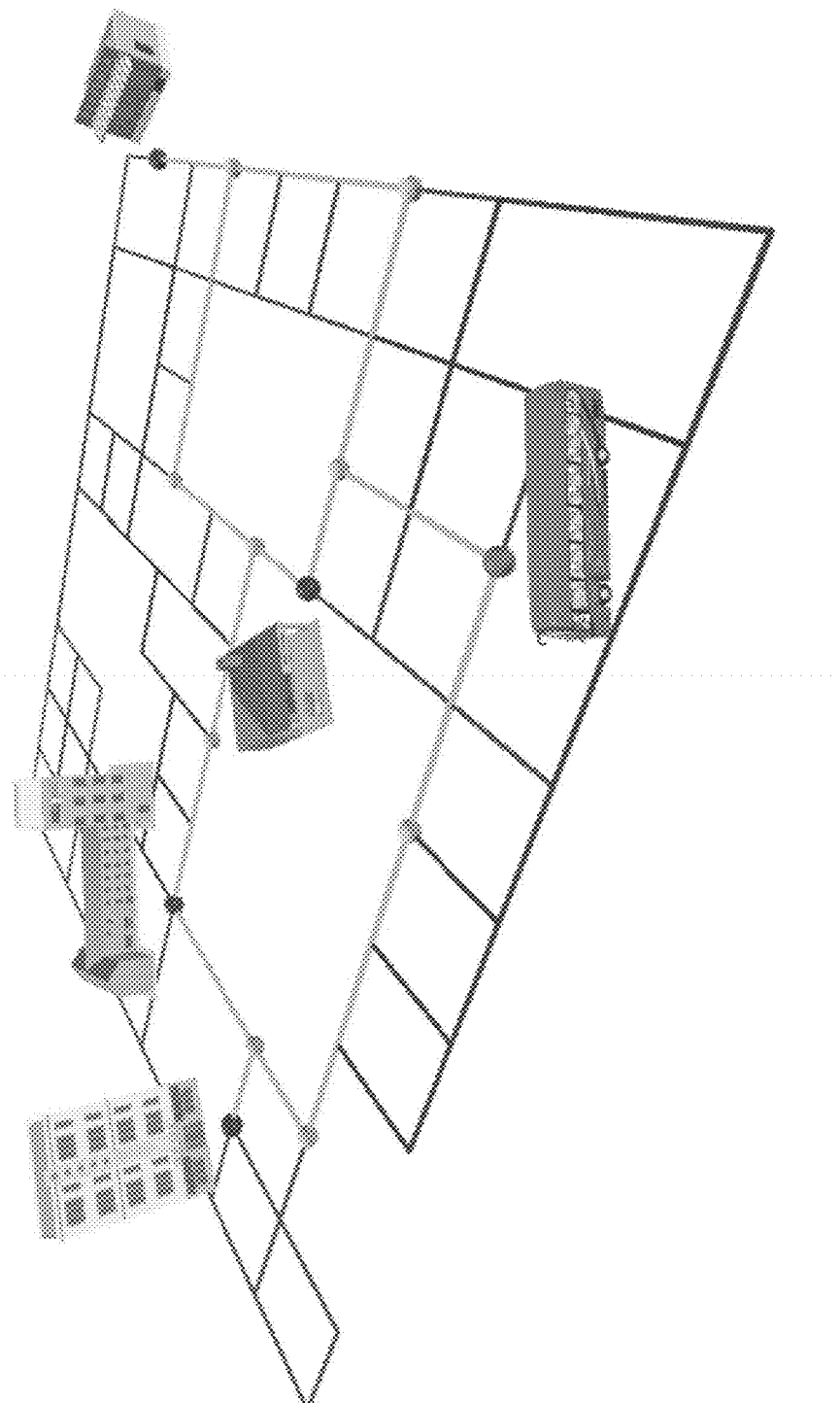
FIG. 12C illustrates the results of an agent-based sign placement step in a city environment with parameters adjusted to reflect a low wayfinding failure rate.

In another experiment, the weight of the wayfinding failure cost term was lowered to 0.01. FIG. 12C shows the resulting sign placement. The system keeps fewer signs, because it is acceptable even if some agents make mistakes and do not walk to the destination within a desired period of walking. Fewer signs are placed as wayfinding failure is more tolerable. The pedestrians walk along some roads (shown in bluelines) not belonging to any path. This setting maybe useful for some situation where it is not critical for the agents to reach the destination, and when space is better preserved for other uses. For example, in a flea market, it may not be critical for the pedestrians to visit each stall as they are expected to wander around in the market.

Figure 12D:
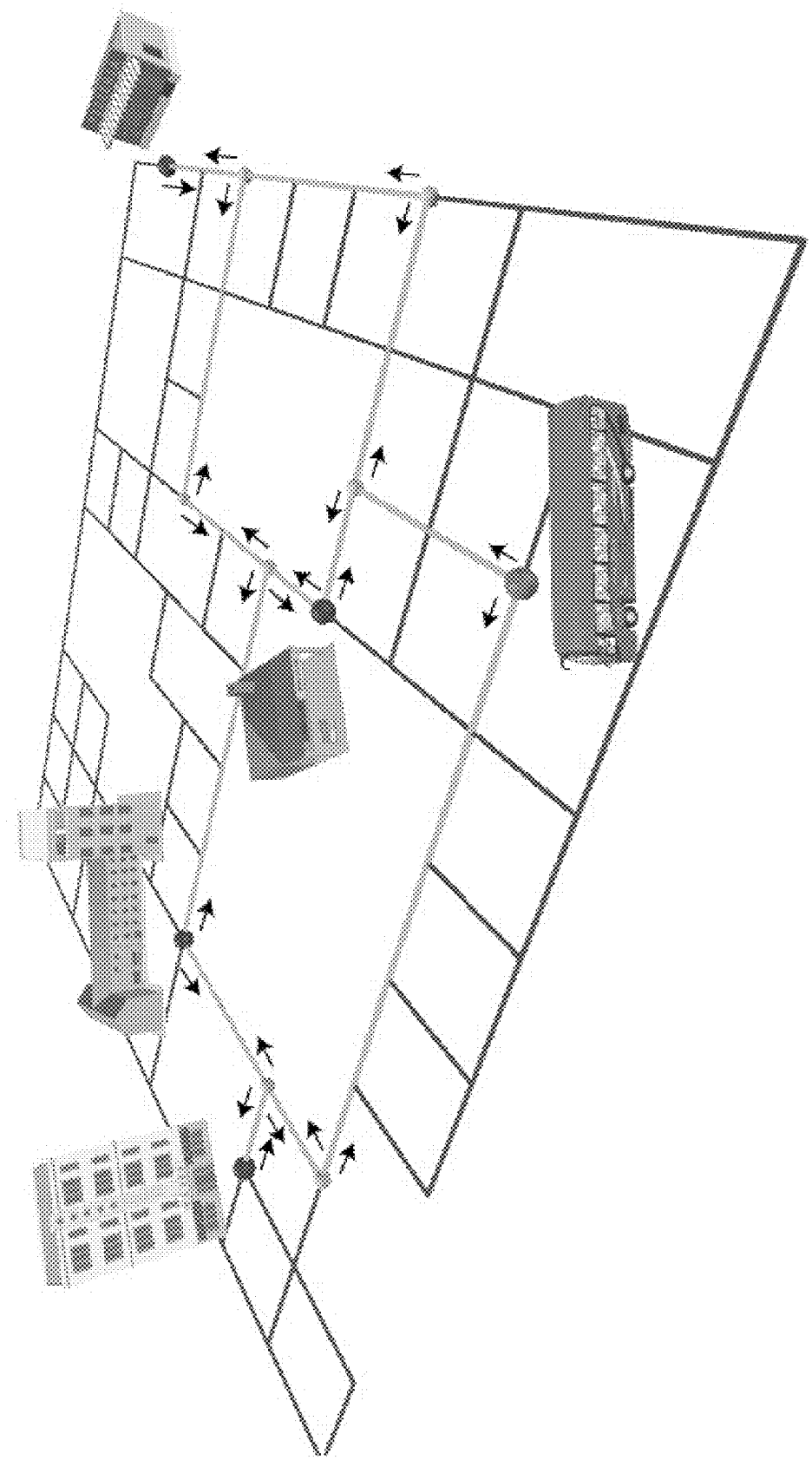
FIG. 12D illustrates the results of an agent-based sign placement step in a city environment with parameters adjusted to reflect high visibility.

In another experiment the visibility parameter was increased to 250 meters. FIG. 12D shows the result. The system keeps only a few signs because the pedestrians are capable of seeing signs at a farther distance. Fewer signs are placed as the pedestrians can see signs far away. This setting is useful for modeling situations where the signs are big (such as those shown in billboards) and can be seen far away.

Dynamic Wayfinding Signs:

The ability to automatically recalculate optimized locations and numbers of wayfinding signs may apply not only to a computer-generated environment, but also to real world environments. Many real-world environments include wayfinding signs that are not static, but rather that may be controlled to change the information displayed on the wayfinding signs. Non-limiting examples include electric signs on highways, within airports, or within subway or bus stations. These signs may be changed, for example, if a highway exit, airport terminal, or subway or bus platform becomes unavailable to direct people to alternate locations that may be used in place of the unavailable exit, terminal, or platform. The information displayed on these real-world signs may also be changed based upon environmental conditions in accordance with the methods disclosed herein.

In one example, if visibility on a highway is high and/or if traffic is sparse, such as during off-peak hours outside of rush hour, signs may display lesser information, for example, less repetitions of distance to an upcoming exit than in conditions in which visibility is low, for example, during foggy, rainy, or snowy weather or during times in which traffic is heavy. The parameter for visibility distance dv may be adjusted to reflect a type of weather or other visibility condition and the optimization disclosed herein run to optimize the number of signs indicating information of interest or the information (if any) displayed in each sign under the selected dv. The parameter for missing chance $Pr_{miss}$ may be increased during high traffic conditions and decreased during low traffic conditions to account for distraction to drivers due to traffic and the optimization disclosed herein run to optimize the number of signs indicating information of interest under the selected $Pr_{miss}$. In some embodiments, under conditions resulting in a high dv and low $Pr_{miss}$, signs that may be activated during conditions of lower dv and higher $Pr_{miss}$ may be partially or wholly deactivated, which may correspond to removing a sign from a layout in the computer-generated scenarios disclosed herein. Deactivated signs may be activated (corresponding to adding a sign in the computer-generated scenarios disclosed herein) under conditions in which dv exceeds a predefined threshold and/or $Pr_{miss}$ drops below a predefined threshold.

Similar adjustments may be made to these or other parameters disclosed herein to wayfinding signs in airports, subway, or bus stations, or other real-world locations based on conditions such as crowdedness, weather, time of day or other conditions that might change a person's visibility or likelihood of missing or misreading a waypoint sign.

Figure 13A:
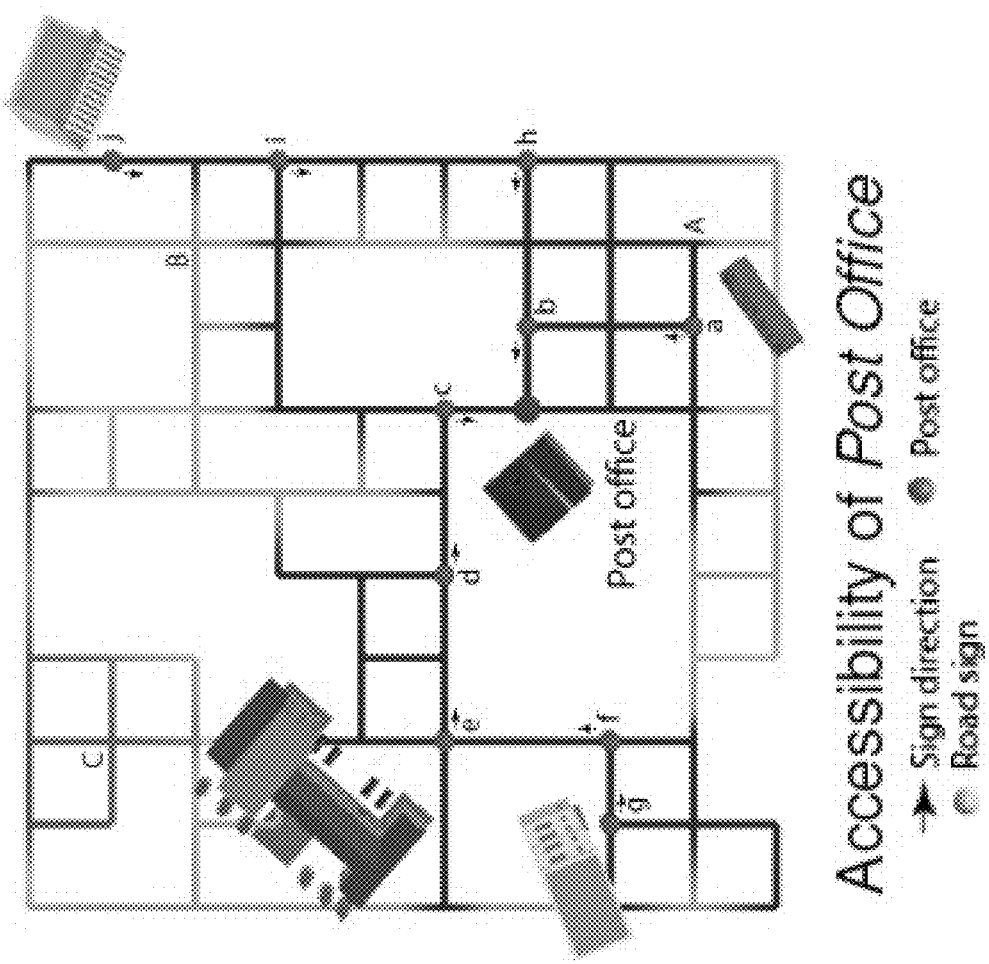
FIG. 13A illustrates accessibility of the Post Office in the city environment visualized as a heatmap.

Visualization of Destination Accessibility:

Aspects and embodiments disclosed herein allow the designer to visualize the accessibility of a destination under the generated wayfinding design. This is a very useful functionality that can help the designer to create a wayfinding design that guides pedestrians from different locations to walk to a destination as desired. FIG. 13A depicts this functionality. The accessibility of a destination (the Post Office) is visualized as a heatmap. Agents in the regions including the roads illustrated in blue can travel to the Post Office successfully by following the wayfinding signs under the current wayfinding design, while those in the regions having roads illustrated in red have a low chance of success. The heatmap may additionally or alternatively depict different regions having different accessibility to a destination in different line patterns instead of or in addition to different colors. The accessibility from location A is good as depicted by the blue color, because a pedestrian can easily see and follow a sign on the west to walk to the Post Office. The accessibility from location B is fair as depicted by the green color. A pedestrian starting at B has a 50% chance to walk to the street towards the north or the east and get lost. The accessibility from location C is poor as depicted by the red color. Without any sign nearby, a pedestrian starting at C has a very low chance to reach the Post Office.

To compute the accessibility heatmap with respect to a destination specified by the designer, embodiments of the disclosed system may sample points at regular intervals along all the edges of the input layout (whether the edges are part of the paths of the generated wayfinding design or not). Agents are employed to walk from each sample point to the destination, in a similar fashion as in the agent-based sign placement step, to compute the rate of success of reaching the specified destination from each of the sample points. The rates of success are used to set the visualization of the heatmap at the corresponding sample points; the heatmap values between two sample points are interpolated.

Note that a destination typically does not need to be accessible from every region, because enforcing such full accessibility will likely involve placing a lot of signs even at some "unimportant" regions. For example, it may not be important to place signs to guide pedestrians how to walk from a post office to a restaurant. By visualizing the accessibility to a destination using a heatmap, the designer can intuitively tell what regions are covered by the current wayfinding design and if any improvement is needed.

If the designer wants to remove a "blind zone" (i.e., a region shown as indicating low accessibility to the destination), he can easily do so by clicking on or otherwise selecting the region via a user interface to a system running the disclosed method. The system may automatically place signs which guide pedestrians to walk from the selected point to the path leading to the destination. This is achieved by re-running the wayfinding scheme optimization and the agent-based sign refinement steps taking the existing solution as the initialization. Note that these additional optimization steps only change the paths and signs related to the newly-added POI; the locations of the signs and paths in the existing solution are fixed.

Figure 13B:
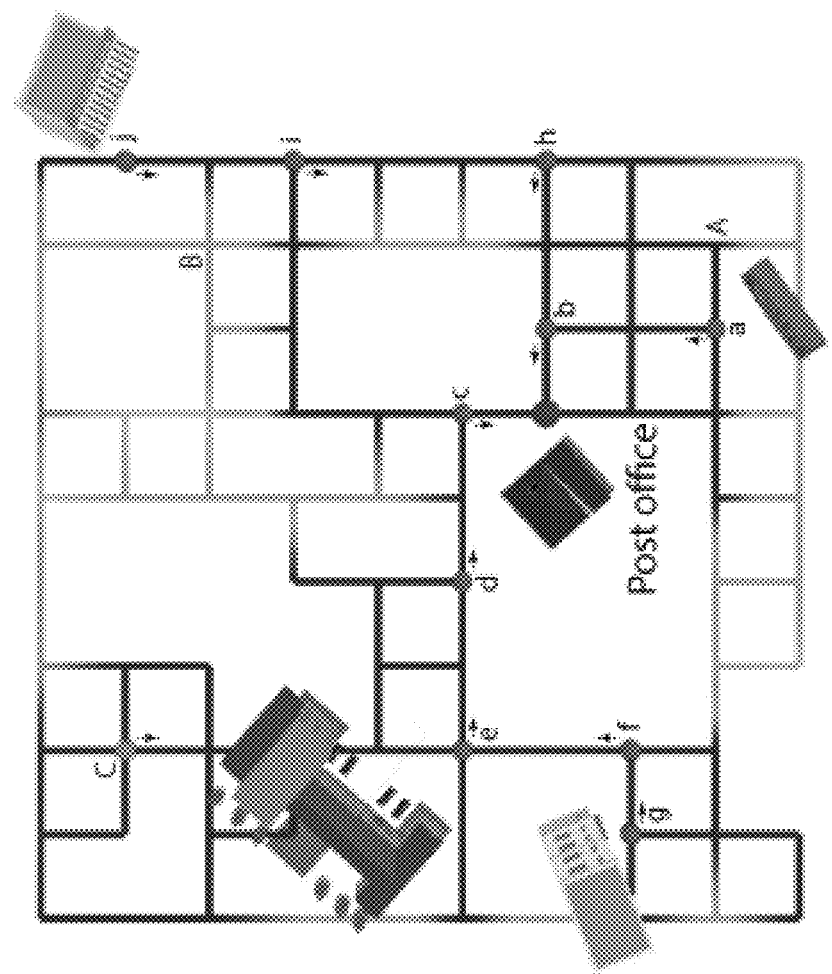
FIG. 13B illustrates accessibility of the Post Office in the city environment visualized as a heatmap after moving the blind zone at point C.

After the optimization steps, agent-based evaluations will be re-run at each sample point to update the heatmap accordingly, which may take about 1 second for the City example. FIG. 13B shows an example of removing a blind zone. The user triggers the system to place a road sign at point C showing the direction to the Post Office. The accessibility around point C is improved, as depicted by the change in color from red to blue on the updated heatmap.

User Study:

A user study was conducted to evaluate the effectiveness of the wayfinding designs generated by the approach disclosed herein. Our user study was conducted in the City layout used as the illustrative example. Participants were asked to navigate from a starting point to a destination under four different wayfinding conditions:

1) No sign.
2) Mini-map: A mini-map that functions like a mini-map in a common first-person 3D video game is shown;
3) Full signs: In this condition, the wayfinding scheme optimization step was only run to generate the paths for the source-destination pairs. Signs are placed at every node along each path.
4) Refined signs: In this condition, the wayfinding scheme optimization step is run to generate the paths, and then the agent-based sign refinement step to refine the sign placement. Signs are placed strategically at some of the nodes along each path.

Figure 14A:
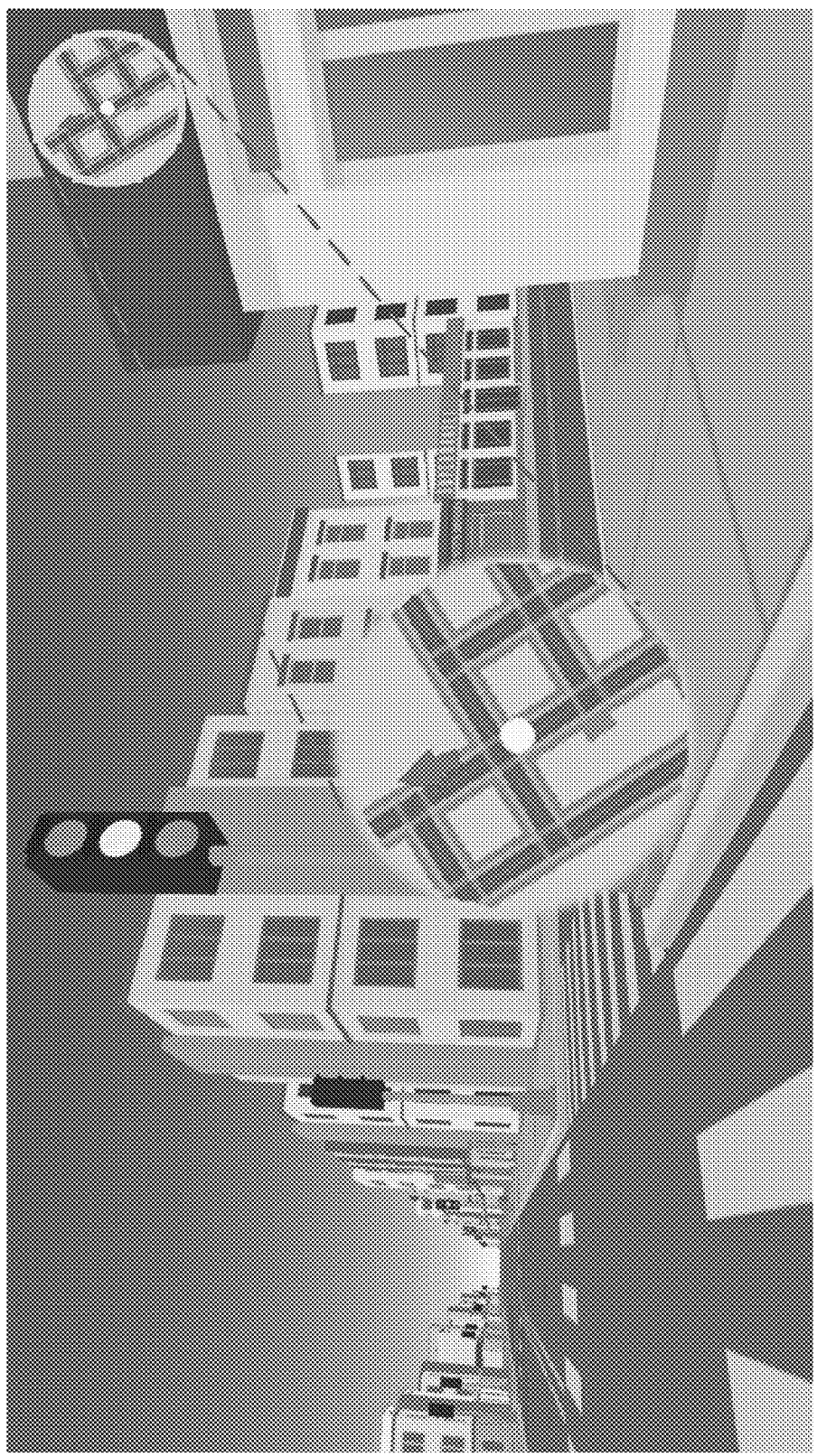
FIG. 14A illustrates a screenshot of a display utilized in a user study test under the mini-map condition.
Figure 14B:
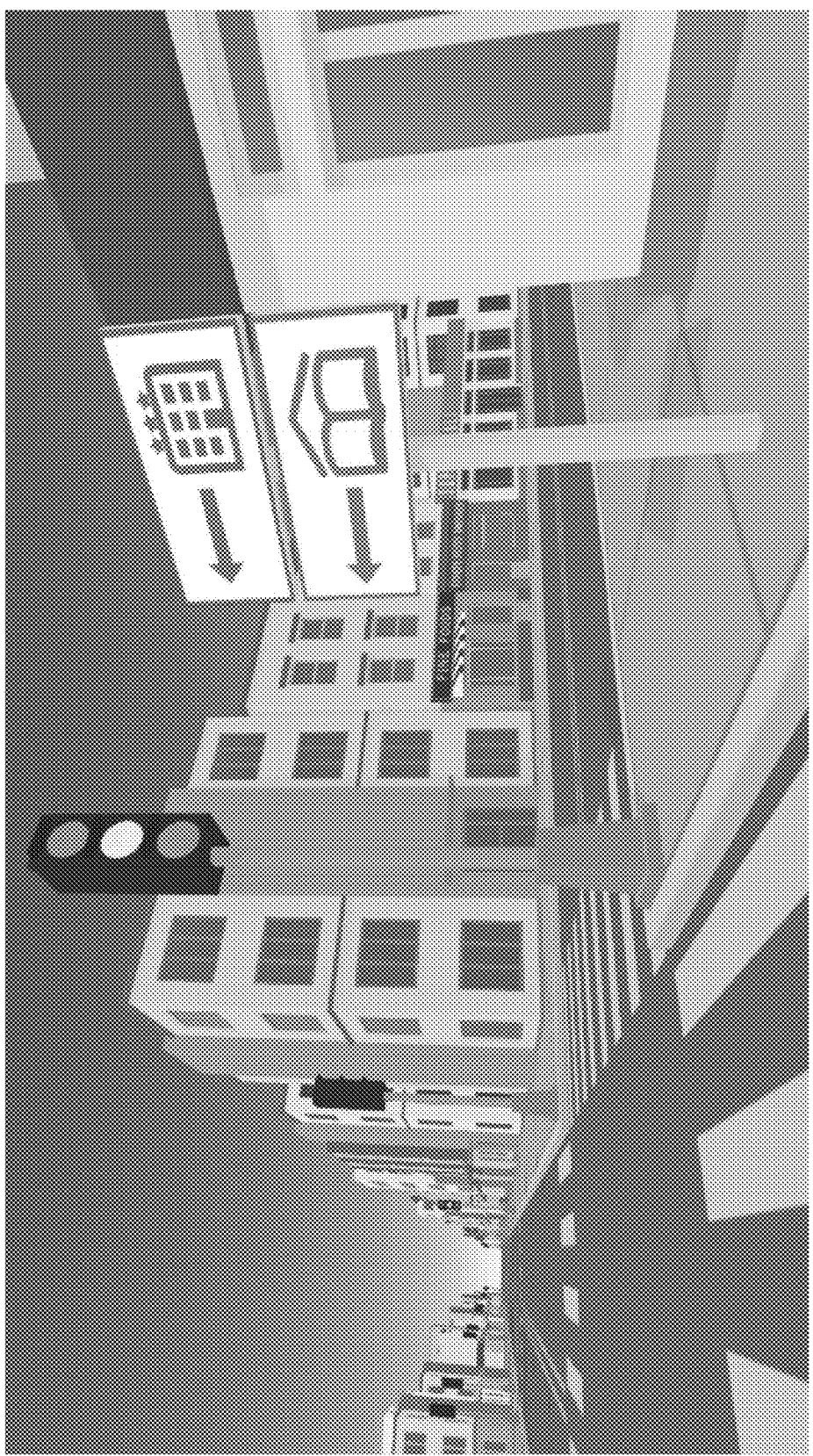
FIG. 14B illustrates a screenshot of a display utilized in the user study tests under the refined signs condition.

FIGS. 14A and 14B shows two screenshots of the user study tests under the mini-map and refined sign conditions, respectively. There were two different scenarios tested. In the first scenario, the participants were asked to walk from the Bus Stop to the Restaurant. In the second scenario, the participants were asked to walk from the Bus Stop to the School. Each scenario was tested by 80 participants under the four different wayfinding conditions (i.e., 20 participants for each condition).

In total, 160 participants were recruited through social networks. The participants were university students. All of them had experience with 3D video games and were familiar with the movement control of common first-person shooting games, which our user study program similarly adopts. Before each test, a description of the task and the movement control was shown to the participant, and the participant was allowed to get familiar with the movement control in a warm-up session.

The goal of the participant in each test was to walk to the destination (School or Restaurant) as fast as he can. To make sure he is clear about the destination, a screenshot of the destination was also shown to the participant before the user study began. The path, the distance walked, and the time taken by the participant were recorded. The test ended if the participant reached the destination, or if the time taken exceeded the time limit, which was defined as three times the time needed to walk from the start to the destination without any stop following the path generated by the wayfinding scheme optimization step. The latter was considered as a failure case.

Results and Analysis:

FIGS. 15A-15D shows the results of the user study for the Bus Stop to Restaurant scenario and FIGS. 16A-16D show the results of the user study for the Bus Stop to School scenario. The paths taken by the participants are visualized in a heatmap. The roads with high usage are shown in red, and those with low usage are shown in blue. There are some interesting observations. Under the no sign condition (FIGS. 15A and 16A), the participants wandered around and could barely reach the destination. Under the mini-map condition (FIGS. 15B and 16B), the participants walked towards their destinations along similar directions. However, there are considerable variations among the paths taken, as can be seen from the dispersion on the heatmaps. For example, in scenario 2, near half of the participants took the bottom path while the other half took the upper path. Under the full signs (FIGS. 15C and 16C) and refined signs (FIGS. 15D and 16D) conditions, all participants walked to the destinations following the same path. The refined sign placement is as effective as the full sign placement but uses a significantly smaller number of signs.

Table 1 below shows the statistics of the distances walked by the participant under different conditions.

TABLE 1

User Study Results

| Condition | Dist. (m) | SD (m) | Time (s) | Success | # Signs |
|---|---|---|---|---|---|
| No Sign | 1,128.28 | 361.22 | 54.19 | 55% | — |
| Mini Map | 515.54 | 35.81 | 34.05 | 100% | — |
| Full Signs | 514.21 | 11.45 | 30.72 | 100% | 8 |
| Refined Signs | 517.83 | 11.95 | 27.59 | 100% | 3 |
| Scenario 1 (Bus Stop to Restaurant) | | | | | |
| No Sign | 1,205.67 | 187.51 | 53.43 | 25% | — |
| Mini Map | 503.32 | 55.27 | 31.18 | 100% | — |
| Full Signs | 471.37 | 6.11 | 29.09 | 100% | 7 |
| Refined Signs | 476.36 | 7.38 | 25.25 | 100% | 3 |
| Scenario 2 (Bus Stop to School) | | | | | |

For the no sign condition, only the data of the participants who could reach their destinations within the time limit is used to calculate the statistics. For the other conditions, all participants can reach the destinations and all data is used to calculate the statistics.

Under the no sign condition, only 55% and 25% of the participants could reach their destinations in Scenario 1 and 2, respectively. For those who could reach the destinations, they generally needed to walk a very long way as shown by the large mean values.

Figure 15A:
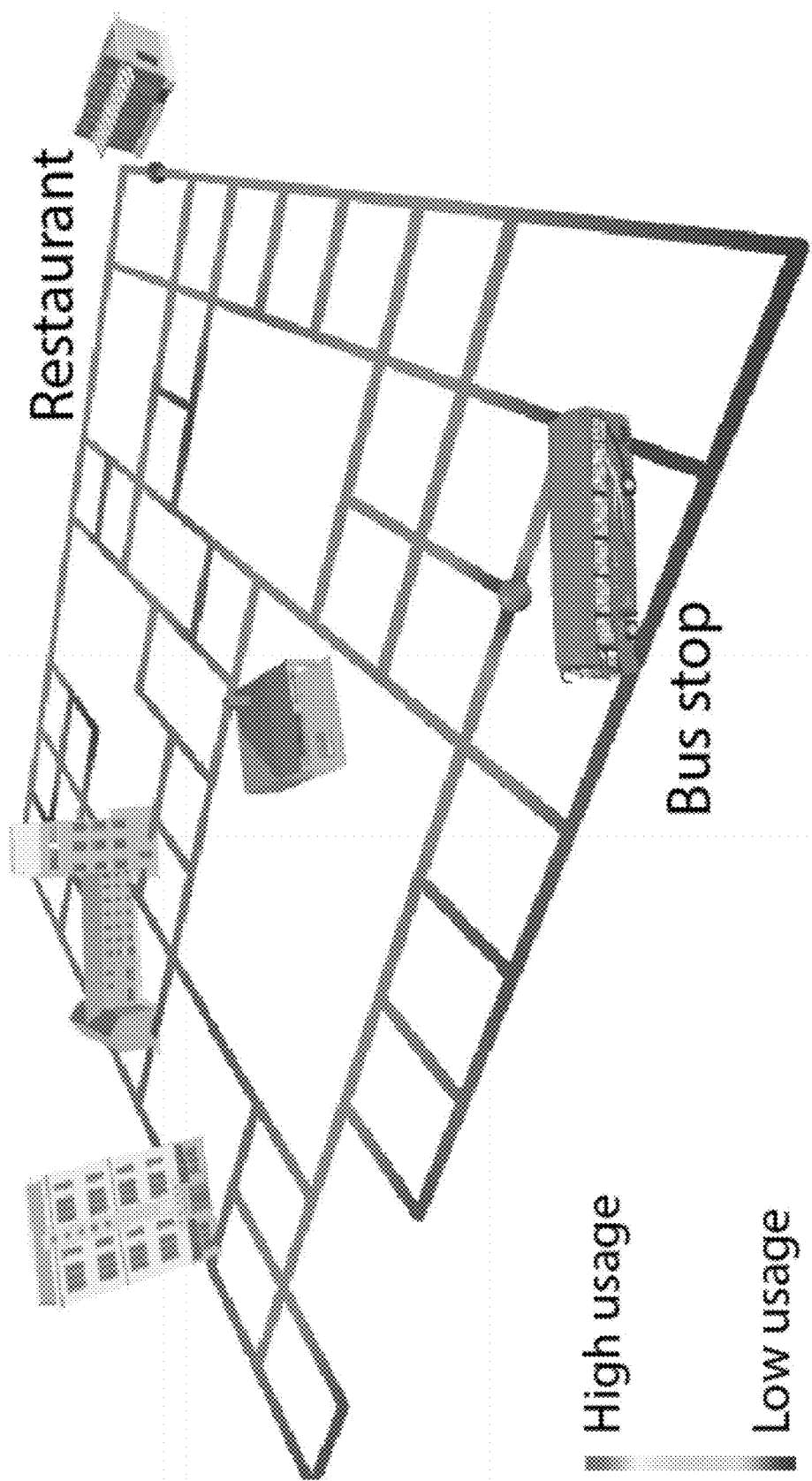
FIG. 15A illustrates paths taken by the participants of the user study in the Bus Stop to Restaurant scenario under the no sign condition.
Figure 15B:
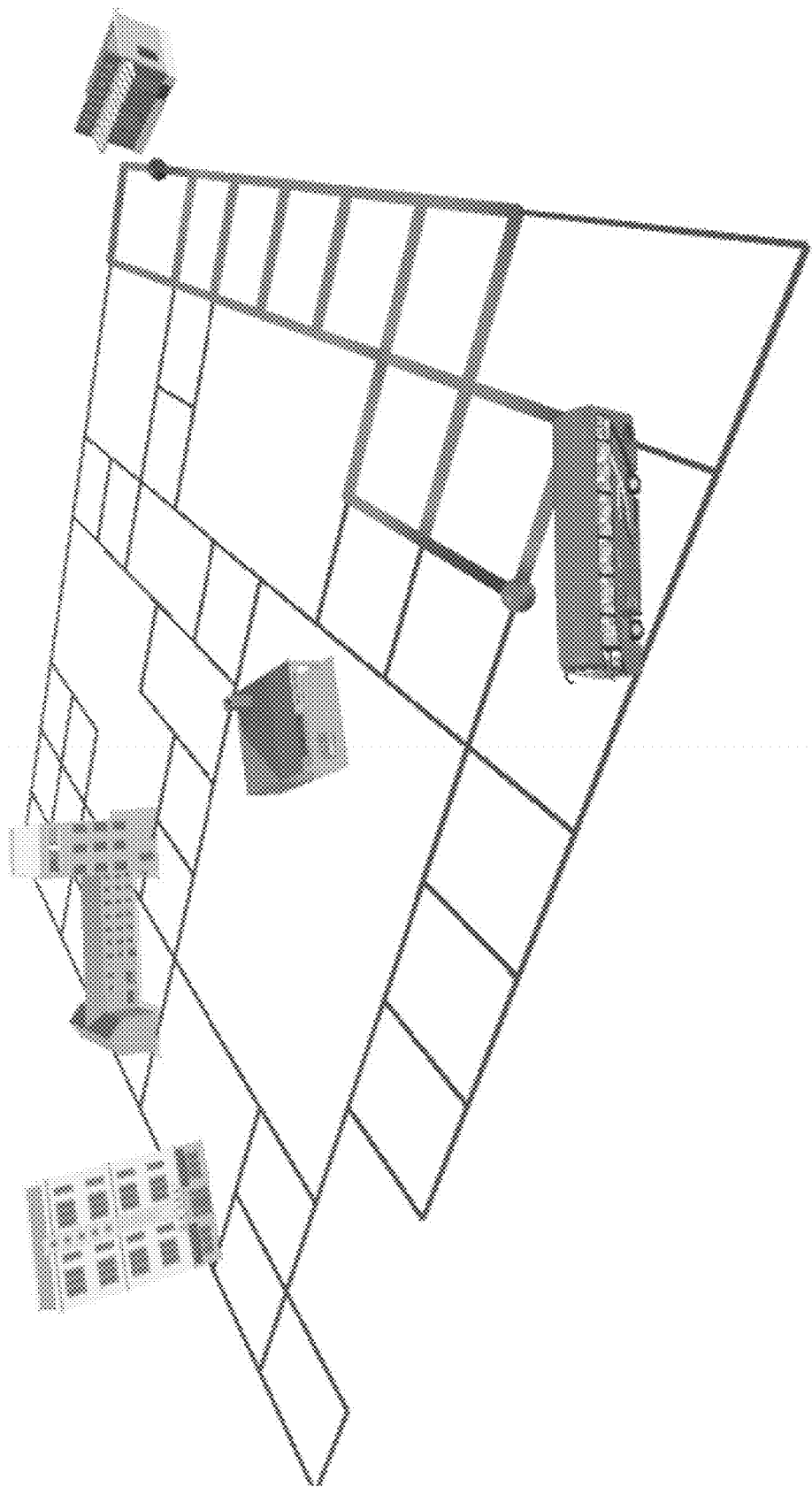
FIG. 15B illustrates paths taken by the participants of the user study in the Bus Stop to Restaurant scenario under the mini-map condition.
Figure 15C:
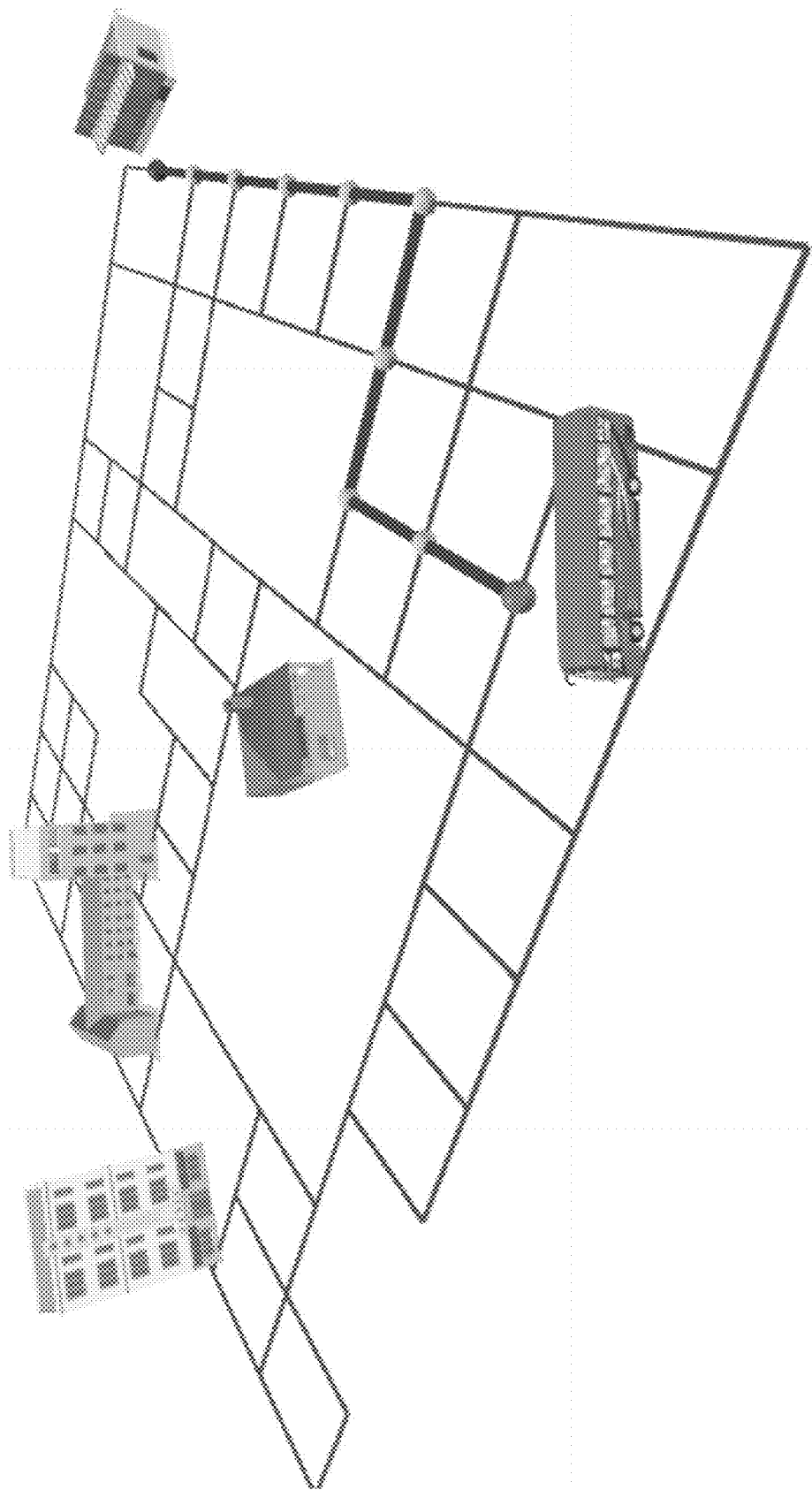
FIG. 15C illustrates paths taken by the participants of the user study in the Bus Stop to Restaurant scenario under the full sign condition.
Figure 15D:
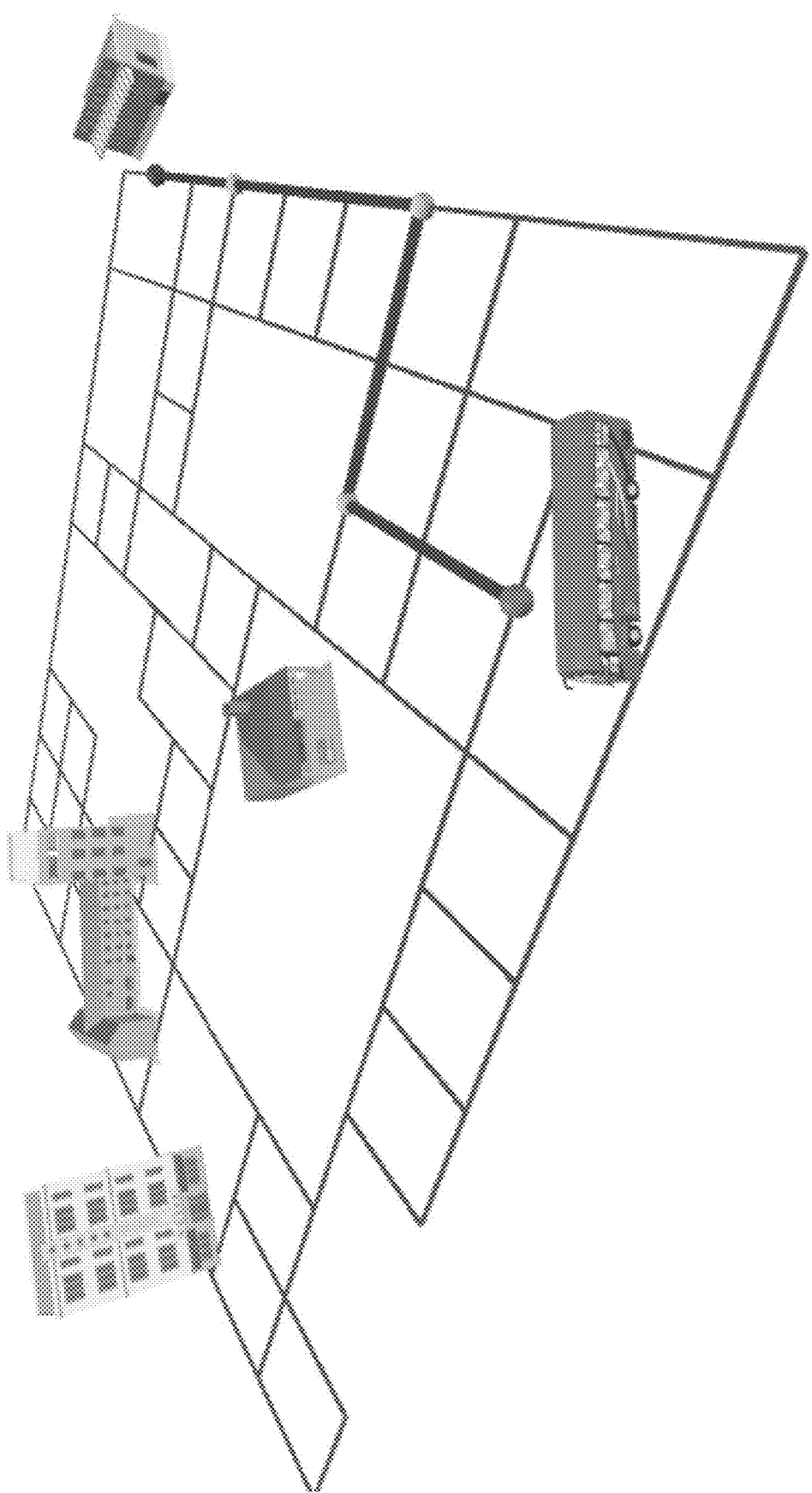
FIG. 15D illustrates paths taken by the participants of the user study in the Bus Stop to Restaurant scenario under the refined signs condition.
Figure 16A:
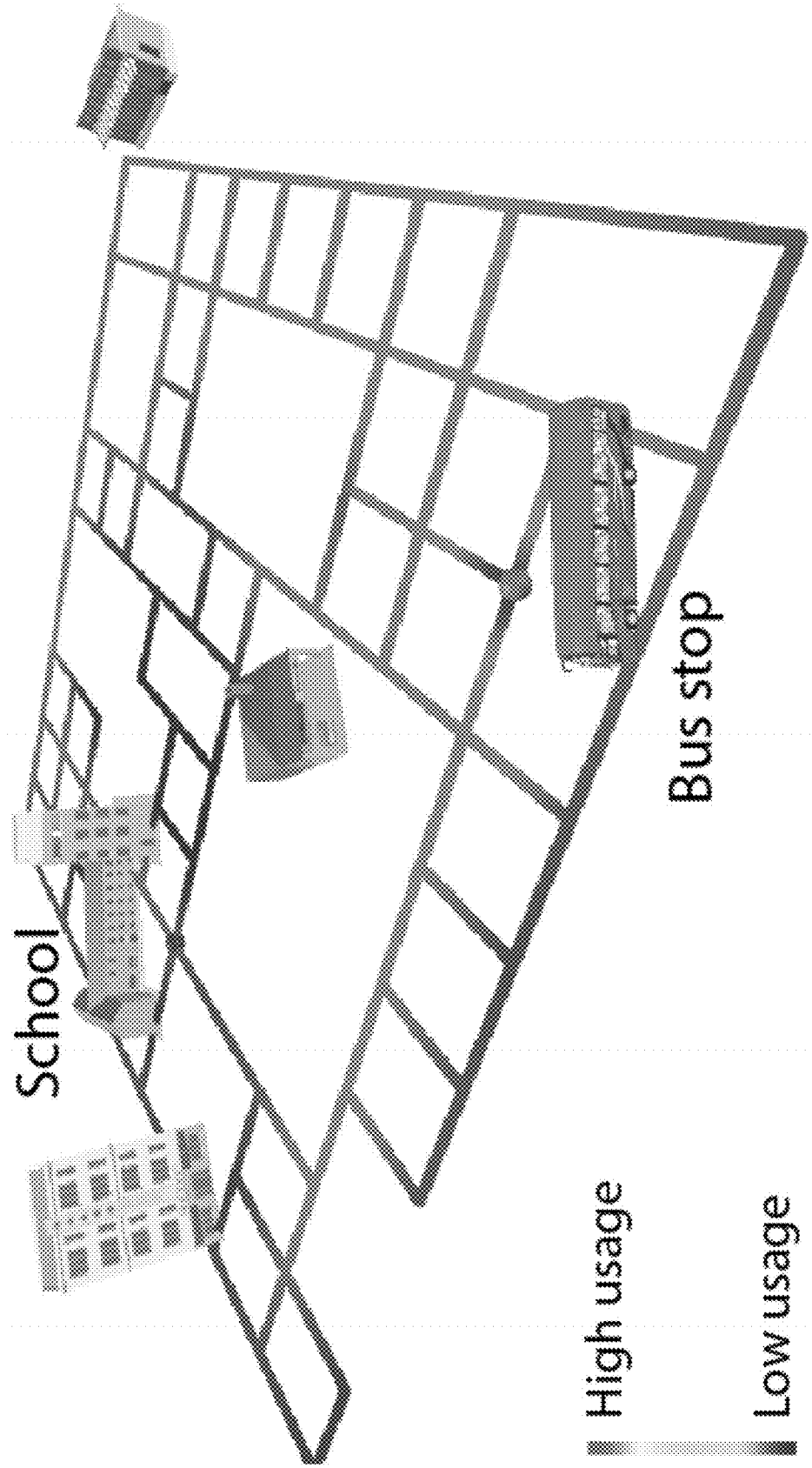
FIG. 16A illustrates paths taken by the participants of the user study in the Bus Stop to School scenario under the no sign condition.
Figure 16B:
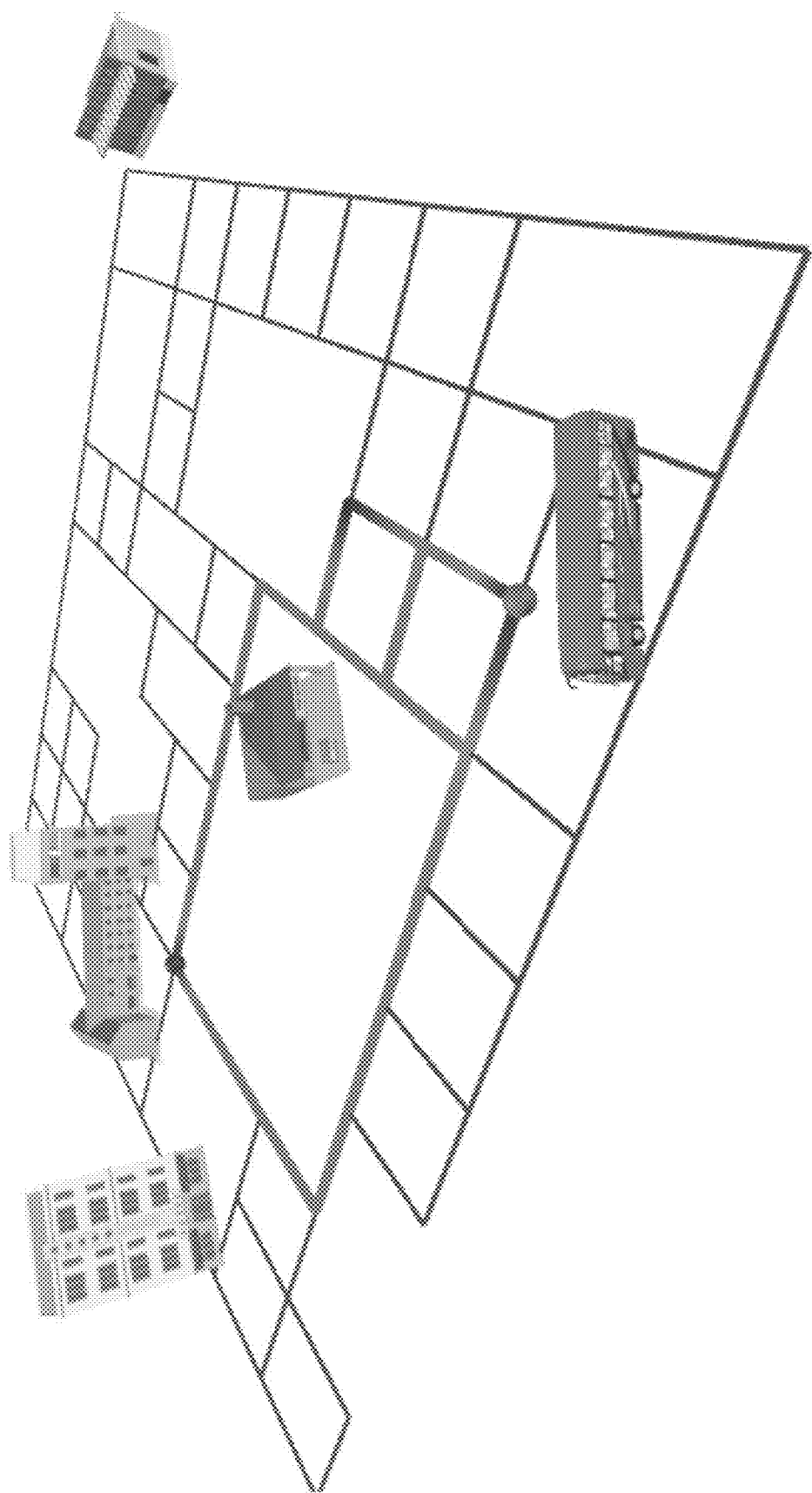
FIG. 16B illustrates paths taken by the participants of the user study in the Bus Stop to School scenario under the mini-map condition.
Figure 16C:
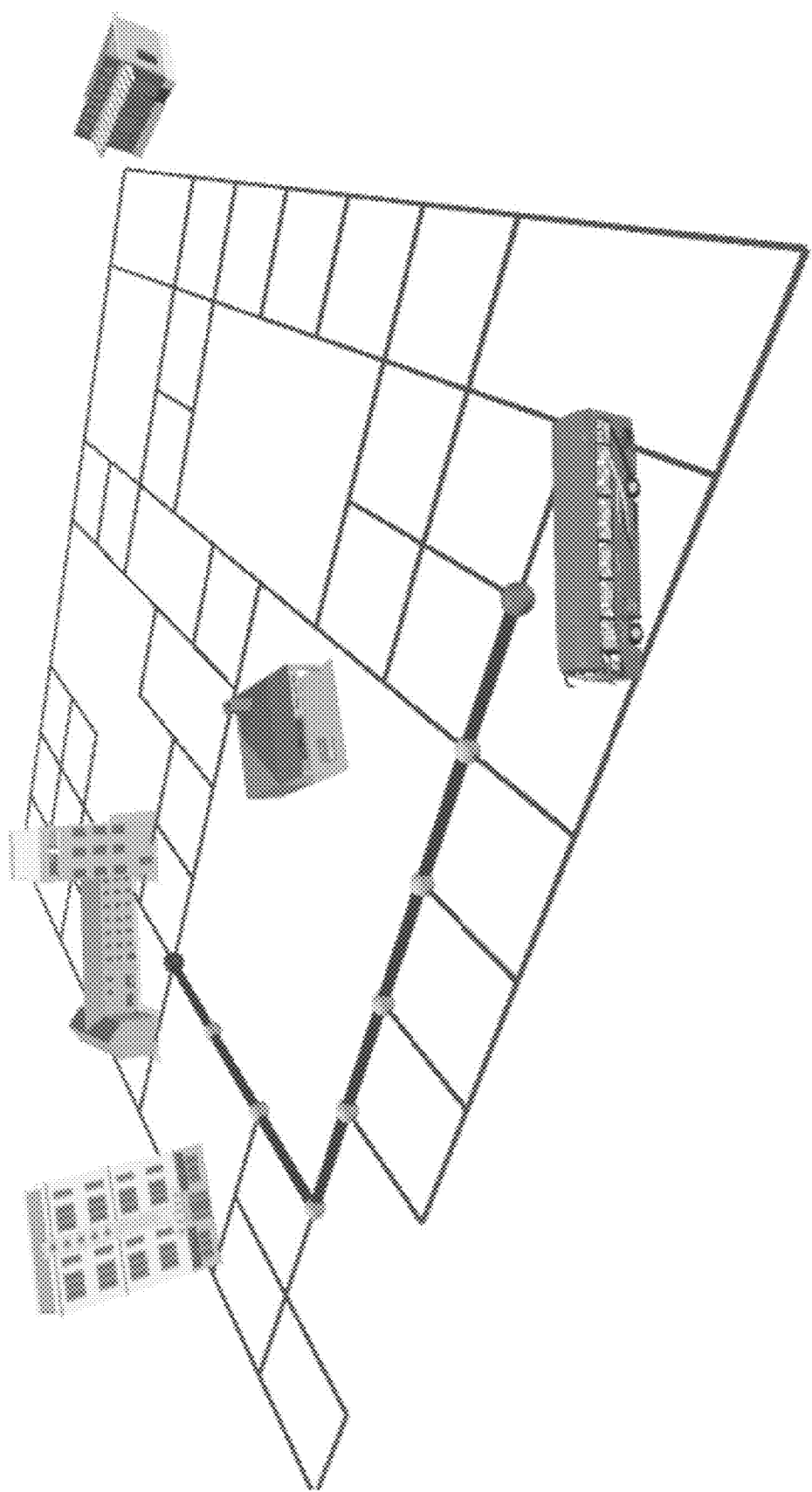
FIG. 16C illustrates paths taken by the participants of the user study in the Bus Stop to School scenario under the full sign condition.
Figure 16D:
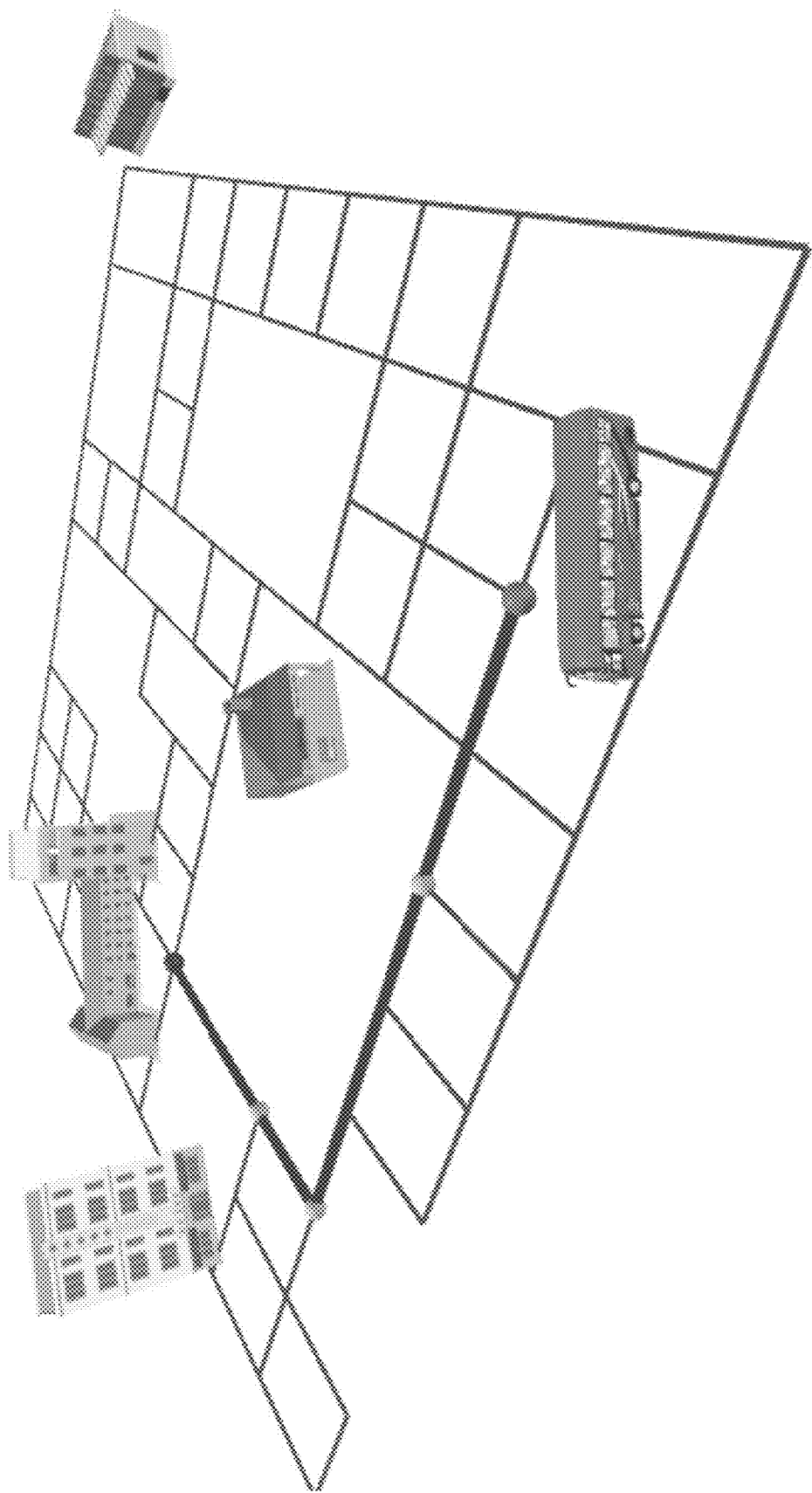
FIG. 16D illustrates paths taken by the participants of the user study in the Bus Stop to School scenario under the refined signs condition.

Under the mini-map condition, all participants could reach their destinations. In Scenario 1, the participants could reach the destination Restaurant by walking a distance similar to that in other conditions. However, the standard deviation (35.81 m) is higher than the standard deviations (11.45 m and 11.95 m) of the other conditions, showing that there are larger variations in performances, due to different paths chosen as shown in FIG. 15B. In Scenario 2, the relative difference in standard deviation is even more pronounced (55.27 m under the mini-map condition, versus 6.11 m and 7.38 m under the other conditions), due to the larger differences in walking distances of the paths chosen. In average, the participants walked a shorter distance to reach the destination under the full signs or refined signs conditions (471.37 m and 476.32 m) than under the mini-map condition (503.32 m).

Under the full signs and refined signs conditions, all participants can reach their destinations. The means and standard deviations of the walked distances are similar. This shows that the refined sign placement is as effective as the full sign placement in guiding the participants to their destinations. However, the refined sign placement uses significantly fewer signs (3 signs under refined sign placement versus 8 signs under full sign placement in Scenario 1; and 3 signs under refined sign placement versus 7 signs under full sign placement in Scenario 2).

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

The invention claimed is:

1. A method for generating a wayfinding design in an environment, the method comprising:
    identifying locations of at least two points of interest in the environment;
    specifying a navigation scenario between the at least two points of interest along pathways between nodes representing intersections of pathways in the environment;
    determining optimized locations for wayfinding aids at selected nodes in the environment by performing a wayfinding aid location optimization including an agent-based sign refinement routine that evaluates wayfinding aid placement, and by performing an optimization of a solution that minimizes a total cost function assigning a cost to a total number of wayfinding aids in the solution; and
    placing wayfinding aids at the optimized locations,
    wherein the total cost function further assigns costs to a total number of wayfinding aids in the solution, a sum of variances in distances between wayfinding aids in each path in the solution, and a percentage of software agents that fail to reach their destinations under the solution.

2. The method of claim 1, wherein at least one of the at least two points of interest is an entrance to the environment.

3. The method of claim 2, wherein specifying the navigation scenario between the at least two points of interest includes determining an optimized path between the at least two points of interest that minimizes a cost function assigning costs to total path length, number of turns, and number of decision points along the path.

4. The method of claim 3, wherein identifying locations of at least two points of interest in the environment includes identifying locations of a plurality of pairs of points of interest in the environment.

5. The method of claim 4, further comprising defining a set of paths including paths between each of the plurality of pairs of points of interest by determining an optimized set of paths that minimizes a cost function assigning costs to path lengths of each of the paths in the set of paths, a number of decision points along each path in the set of paths, a sum of all turning angles for each path in the set of paths, a sum of path lengths for all paths in the set of paths, and a total number of different intersections in the set of paths.

6. The method of claim 5, wherein a number of different candidate paths between each respective pair of points of interest considered when determining the optimized set of paths is limited to a predetermined maximum number of shortest paths.

7. The method of claim 6, wherein a candidate path between a pair of points of interest is only considered when determining the optimized set of paths if the candidate path is less than a predetermined length longer than a path having a minimum distance between the pair of points of interest.

8. The method of claim 5, wherein a greater weight is given to costs associated with the sum of all turning angles for each path in the set of paths than to costs associated with each of the path lengths of each of the paths in the set of paths, the number of decision points along each path in the set of paths, the sum of path lengths for all paths in the set of paths, and the total number of different intersections in the set of paths.

9. The method of claim 8, wherein a lower weight is given to costs associated with each of the costs associated with each of the path lengths of each of the paths in the set of paths and the number of decision points along each path in the set of paths than costs associated with each of the sum of path lengths for all paths in the set of paths and the total number of different intersections in the set of paths.

10. The method of claim 5, wherein determining the optimized set of paths includes performing an optimization including:
    determining a first solution for the set of paths in a first iteration;
    determining a second solution for the set of paths in a second iteration;
    one of accepting the second solution as the optimized set of paths responsive to the second solution having a lower cost function than the first solution or accepting the second solution with an acceptance probability inversely proportional to a value of the cost function of the second solution if the second solution has a higher cost function than the first solution;
    determining additional solutions for the set of paths in additional iterations;

one of accepting a newly determined solution as the optimized set of paths responsive to the newly determined solution having a lower cost function than a solution determined immediately prior to the newly determined solution or accepting the newly determined solution with an acceptance probability inversely proportional to a value of the cost function of the newly determined solution if the newly determined solution has a higher cost function than the solution determined immediately prior to the newly determined solution; and terminating the optimization if an absolute change in the value of the cost function is less that a predetermined amount over a predetermined number of iterations.

11. The method of claim 1, wherein placing the wayfinding aids at the optimized locations includes placing wayfinding signs including indications of directions to destination points of interest and one of a name or symbol identifying a respective destination point of interest at the optimized locations.

12. The method of claim 1, wherein performing the optimization of the solution includes performing an optimization against cost terms reflecting quality of wayfinding experience brought about by the wayfinding aids that starts with the solution including placing a wayfinding aid at every node in the environment and then iteratively altering a number and locations of the wayfinding aids to optimize a cost function including the cost terms.

13. The method of claim 12, wherein performing the optimization of the solution includes performing a pre-processing step of, for each pathway between adjacent nodes having a length longer than a predefined distance, adding an additional node representing an additional possible location for a wayfinding aid between the adjacent nodes.

14. The method of claim 1, wherein the percentage of software agents that fail to reach their destinations under the solution is determined utilizing an agent-based simulation including an agent model having agents that mimic a pedestrian traveling from a source to a destination in the environment, each agent starting from the source and seeing, with a predetermined probability, any unoccluded wayfinding aid within a predefined visible distance, each agent following an observed wayfinding aid pointing to its destination to chose a direction to travel, each agent, when arriving at an intersection but not being provided with instructions on a direction to take, randomly selecting a pathway of the intersection along which to travel with equal probability.

15. The method of claim 14, wherein the agent-based simulation is performed utilizing a plurality of agents and the percentage of software agents that fail to reach their destinations is determined from a number of the plurality of agents that reach their destination by traveling along a path having less than a predetermined multiple of a minimum path length along the pathways from the source to the destination.

16. The method of claim 15, wherein each iteration of the optimization includes determining a new solution by altering an immediately previous solution by performing a move randomly selected from a group consisting of adding one or two signs to one or two source-destination pairs, removing one or two signs from one or two source-destination pairs, and moving a wayfinding aid from one node to another node of a pathway of a source-destination pair.

17. The method of claim 16, further comprising:
one of accepting a new solution as an optimized solution responsive the new solution having a lower cost function than a solution determined immediately prior to the new solution or accepting the new solution as an optimized solution with an acceptance probability inversely proportional to a value of the cost function of the new solution if the new solution has a higher cost function than the immediately previous solution; and
performing additional iterations of the optimization until an absolute change in the value of the total cost function is less that a predetermined amount over a predetermined number of iterations.

18. The method of claim 1, further comprising:
altering weights assigned to factors in the total cost function based on a change to one or more or an environmental variable or a time of day;
repeating the optimization utilizing the altered weights; and
altering information displayed on the wayfinding aids responsive to a result of the optimization.

19. The method of claim 1, further comprising displaying a map illustrating accessibility of a destination from different locations in the environment.

20. The method of claim 19, further comprising removing a blind zone from the environment by placing an additional wayfinding aid in the environment and rerunning the wayfinding aid location optimization.

21. A computer system including a processor and instructions, which when performed on the processor, cause the processor to perform the method of claim 1.

22. A non-transitory computer readable media on which is encoded instructions, which when executed on a processor of a computer system, cause the processor to perform the method of claim 1.

* * * * *